(12) United States Patent
Holroyd et al.

(10) Patent No.: US 10,179,504 B2
(45) Date of Patent: Jan. 15, 2019

(54) SUNSHADE FOR A VEHICLE

(71) Applicant: Polaris Industries Inc., Medina, MN (US)

(72) Inventors: James A. Holroyd, Stillwater, MN (US); Garth H. Bracy, Robbinsdale, MN (US); Daniel G. Ritz, Ontario (CA); Alex M. Baltes, North Branch, MN (US)

(73) Assignee: Polaris Industries Inc., Medina, MN (US)

( * ) Notice: Subject to any disclaimer, the term of this patent is extended or adjusted under 35 U.S.C. 154(b) by 0 days.

(21) Appl. No.: 15/197,372

(22) Filed: Jun. 29, 2016

(65) Prior Publication Data

US 2017/0334268 A1 Nov. 23, 2017

Related U.S. Application Data

(63) Continuation-in-part of application No. 29/565,196, filed on May 18, 2016.

(51) Int. Cl.
*B62D 25/06* (2006.01)
*B60J 7/16* (2006.01)

(52) U.S. Cl.
CPC .................. *B60J 7/1642* (2013.01)

(58) Field of Classification Search
CPC ........ B60J 1/2011; B60J 7/0015; B60J 7/003; B60J 1/2063; B60J 11/00; B60J 1/2091; B60J 3/0221; B60J 7/047; A45B 23/00
USPC ............. 296/102, 214, 97.8, 210, 223, 97.1
See application file for complete search history.

(56) References Cited

U.S. PATENT DOCUMENTS

| | | | | |
|---|---|---|---|---|
| 3,964,782 A | * | 6/1976 | Pernicka | B60R 21/131 296/102 |
| 4,684,167 A | * | 8/1987 | Newmayer | B60J 5/0473 16/223 |
| 4,728,251 A | * | 3/1988 | Takashima | E02F 3/32 414/694 |
| 5,035,463 A | * | 7/1991 | Kato | B60J 7/1642 296/146.11 |
| 5,242,208 A | * | 9/1993 | Ohya | B60J 1/14 296/146.1 |
| 6,179,365 B1 | * | 1/2001 | Hennessey | B60J 3/0217 16/250 |
| 6,231,109 B1 | * | 5/2001 | Beaver | B60J 3/023 248/229.26 |
| 6,398,295 B2 | * | 6/2002 | Asai | B60J 3/0221 296/146.7 |
| 7,213,854 B2 | * | 5/2007 | Dowdey | B60J 7/11 296/218 |

(Continued)

OTHER PUBLICATIONS

New KTM X-Bow GT4 Coupe Breaks Cover, www.dailysportscar.com, Apr. 3, 2015; 5 pages.

(Continued)

*Primary Examiner* — Kiran B Patel
(74) *Attorney, Agent, or Firm* — Faegre Baker Daniels LLP

(57) ABSTRACT

A sunshade is configured to extend over a portion of an operator area of the vehicle and includes a frame configured to be removably coupled to mounts for side view mirrors of the vehicle and a body coupled to the frame. At least a portion of the body is configured to move between a raised position and a lowered position relative to the vehicle.

17 Claims, 27 Drawing Sheets

(56) References Cited

U.S. PATENT DOCUMENTS

| | | | | |
|---|---|---|---|---|
| 8,794,692 | B1* | 8/2014 | Burke | B60J 5/0473 |
| | | | | 280/756 |
| 2005/0037892 | A1* | 2/2005 | Nakatani | B60W 10/06 |
| | | | | 477/120 |
| 2007/0126260 | A1* | 6/2007 | Geyrhofer | B60J 5/047 |
| | | | | 296/146.12 |
| 2007/0158974 | A1* | 7/2007 | Woodhouse | B60J 5/0472 |
| | | | | 296/146.11 |
| 2007/0245525 | A1* | 10/2007 | Hoffman | B60J 5/0472 |
| | | | | 16/367 |
| 2007/0283535 | A1* | 12/2007 | Hoffman | B60J 5/0473 |
| | | | | 16/366 |
| 2010/0259067 | A1* | 10/2010 | Bell | B60J 5/0473 |
| | | | | 296/146.11 |
| 2011/0314953 | A1* | 12/2011 | Nakamura | B62D 1/184 |
| | | | | 74/493 |
| 2014/0044576 | A1* | 2/2014 | Geisland | B60H 1/244 |
| | | | | 417/423.5 |
| 2015/0210163 | A1* | 7/2015 | Murakawa | B60K 17/28 |
| | | | | 180/292 |
| 2016/0032625 | A1* | 2/2016 | Suzuki | B60J 5/0487 |
| | | | | 296/146.5 |
| 2016/0046241 | A1* | 2/2016 | Crismon | B60J 7/106 |
| | | | | 224/326 |
| 2016/0109858 | A1* | 4/2016 | Oetken | E01C 19/288 |
| | | | | 404/84.05 |
| 2017/0267078 | A1* | 9/2017 | Murray | B60J 7/11 |

OTHER PUBLICATIONS

MadStad Stinger Roof—Polaris Slingshot Forum, www.slingshotforums.com, Oct. 24, 2015; 11 pages.
Twist Custom Tops—Twist Dynamics, http://twist.mybigcommerce.com/twist-custom-tops/, copyright 2016; 2 pages.
Twist Dynamics, www.twistdynamics.com, copyright 2015; 2 pages.
Polaris Slingshot Panoramic Roof Top by Fab Factory, www.slingmods.com, copyright 2016; 7 pages.
Bullet Speed V Back Top for the Polaris Slingshot—Slingshot Only, www.slingshotonly.com, copyright 2016; 5 pages.
Slinglines Slingshot—Roof Enclosure for Polaris, www.slinglines.com, copyright 2016; 5 pages.
MadStad Stinger Roof System for the Polaris Slingshot, www.madstad.com, copyright 2016; 3 pages.
Twist Gullwing—Twist Dynamics, http://twist.mybigcommerce.com/twist-gullwing/, copyright 2016; 2 pages.
Polaris Slingshot Panoramic Roof Top by Fab Factory, www.slingmods.com/polaris-slingshot-panoramic-top; copyright 2016, 8 pages.

* cited by examiner

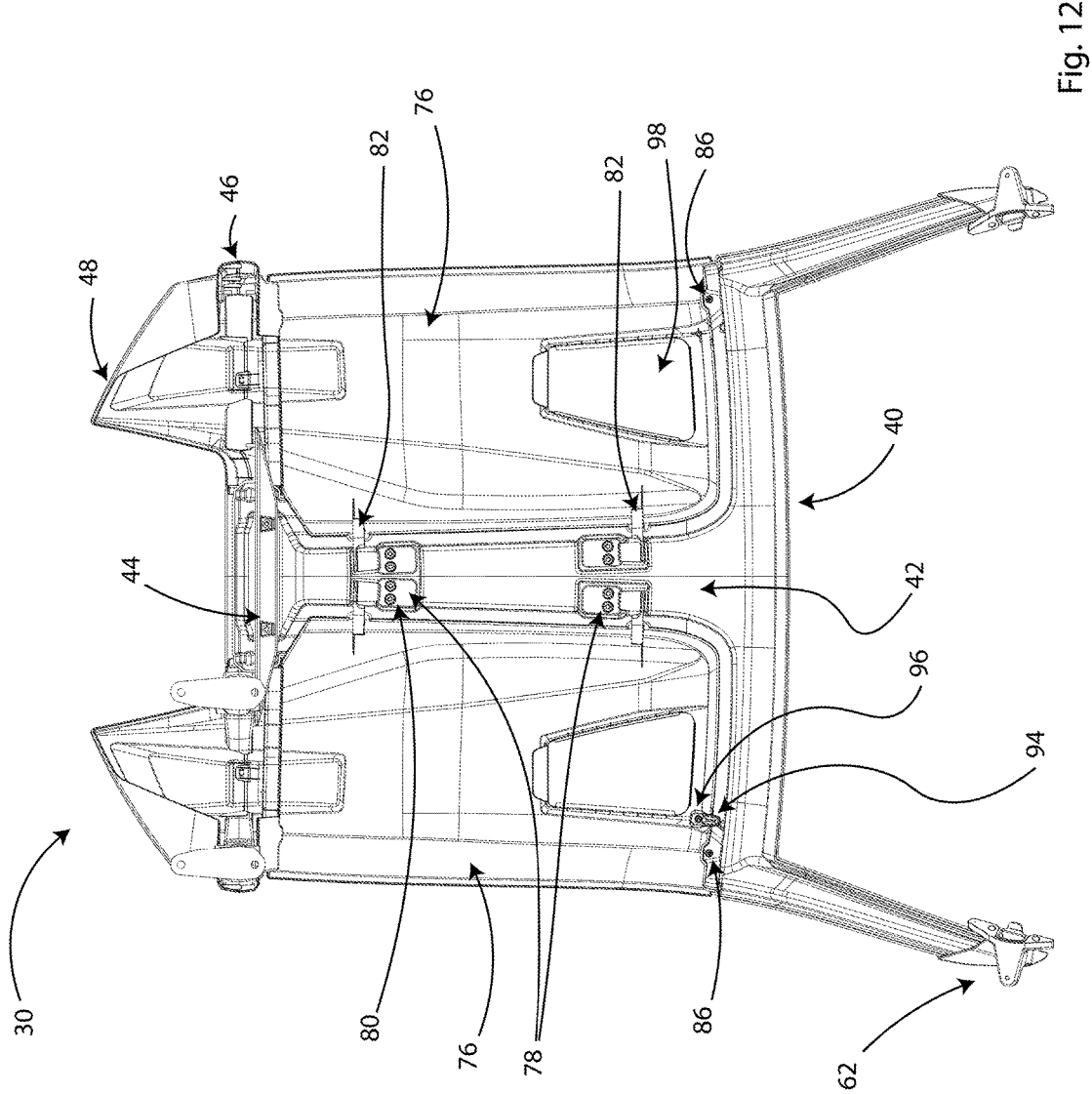

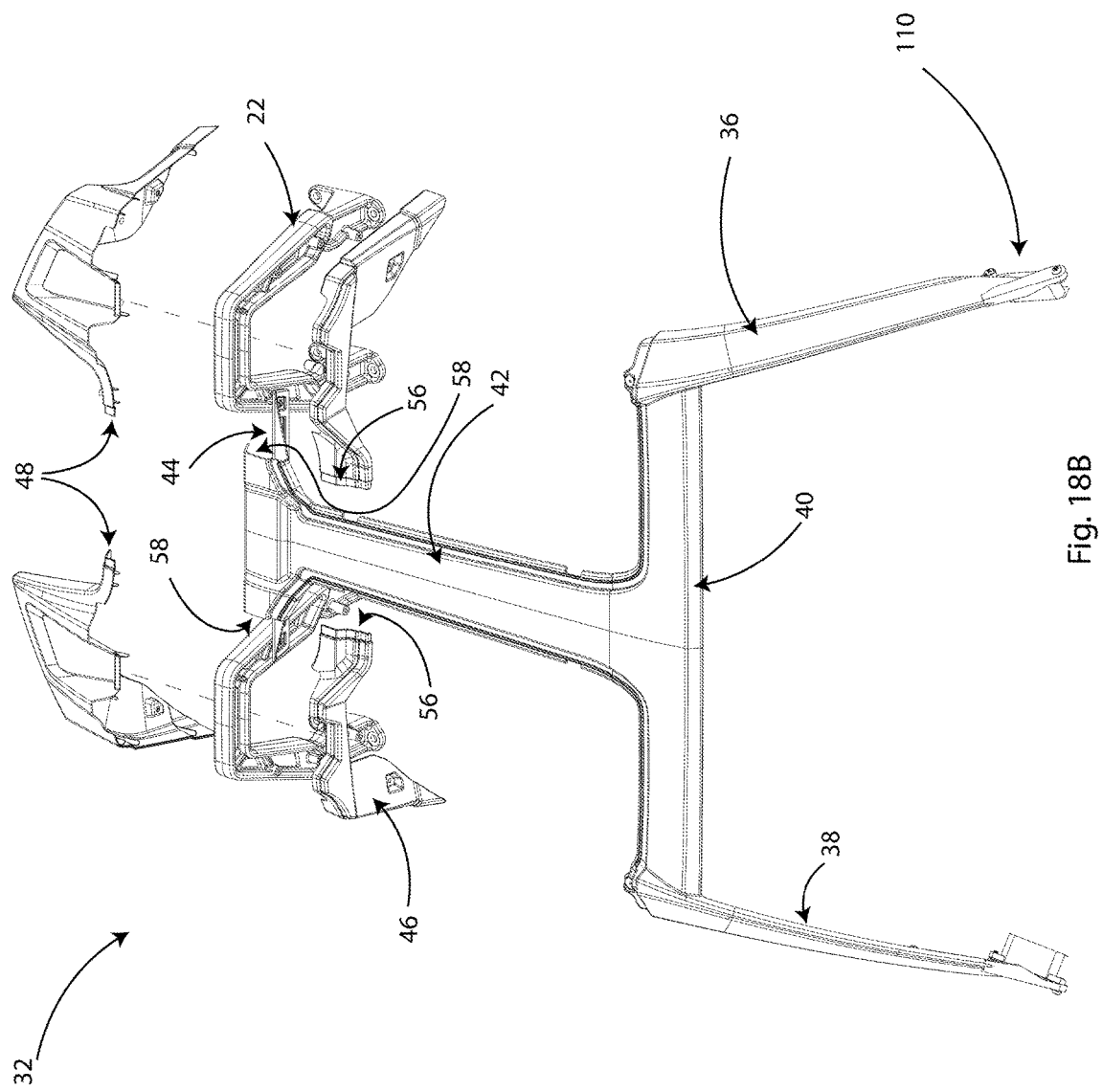

SUNSHADE FOR A VEHICLE

CROSS-REFERENCE TO RELATED APPLICATIONS

The present application is a continuation-in-part of U.S. Design patent application Ser. No. 29/565,196, filed on May 18, 2016, and entitled "SUNSHADE FOR A VEHICLE", the complete disclosure of which is expressly incorporated by reference herein.

FIELD OF THE DISCLOSURE

The present invention relates to a sunshade for a vehicle and, more particularly, to a sunshade with at least a portion configured to move relative to the vehicle to facilitate passenger ingress and egress.

BACKGROUND OF THE DISCLOSURE

Some vehicles may be configured with an open cockpit or operator area. This allows the operator and any passengers in the vehicle to have a unique driving or riding experience by being exposed to the weather and environment. However, at times, it may be useful to enclose the operator area, for example during inclement weather, in rain, or in hot temperatures.

SUMMARY OF THE DISCLOSURE

According to an illustrative embodiment of the present disclosure, a sunshade for a vehicle comprises a frame, a body coupled to the frame and configured to extend over a portion of an operator area of the vehicle, and a magnetic coupling assembly. The magnetic coupling assembly includes a first magnetic member coupled to at least one of the frame and the body and a second magnetic member coupled to the body. The first and second magnetic member are configured to magnetically retain a portion of the body on the frame.

According to another illustrative embodiment of the present disclosure, a sunshade is configured to extend over a portion of an operator area of a vehicle and comprises a frame configured to be removably coupled to mounts for side view mirrors of the vehicle and a body coupled to the frame. At least a portion of the body is configured to move between a raised position and a lowered position relative to the vehicle.

According to a further illustrative embodiment of the present disclosure, a sunshade is configured to extend over a portion of an operator area of a vehicle and comprises a frame configured to be coupled to the vehicle and a body coupled to the frame. The body includes at least one portion extending upwardly from the frame which defines an uppermost surface of the vehicle when the sunshade is coupled to the vehicle.

BRIEF DESCRIPTION OF THE DRAWINGS

The above mentioned and other features of this invention, and the manner of attaining them, will become more apparent and the invention itself will be better understood by reference to the following description of embodiments of the invention taken in conjunction with the accompanying drawings, where:

FIG. 12 is a bottom view of an underside of the sunshade of FIG. 1, including hinges for moving the portion of the sunshade between the raised position of FIG. 7 and the lowered position of FIG. 2;

FIG. 18B is a further exploded view of the frame of FIG. 18A;

Figure 1:
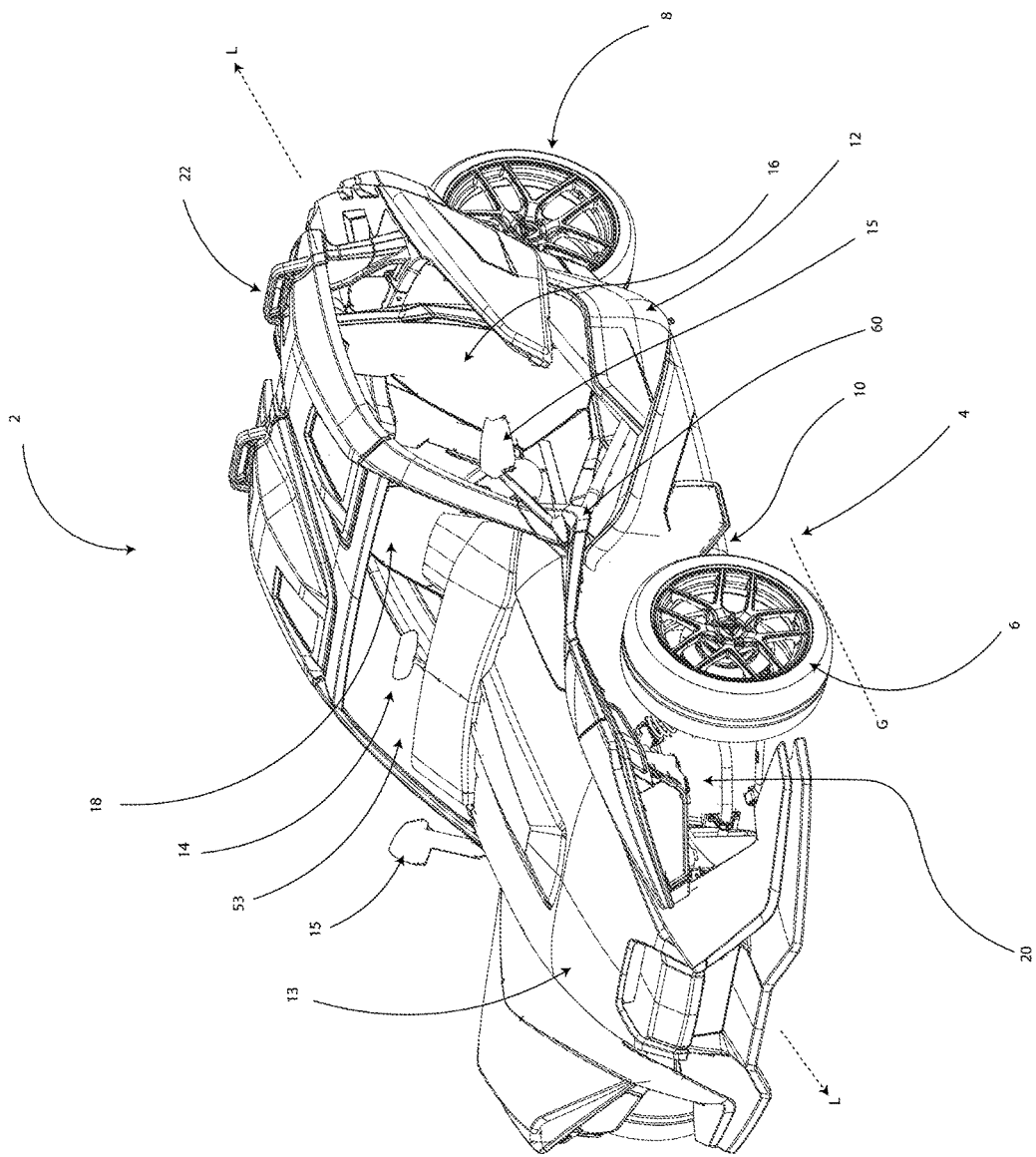
FIG. 1 is a front left perspective view of a vehicle coupled to a sunshade of the present disclosure.

Corresponding reference characters indicate corresponding parts throughout the several views. Although the drawings represent embodiments of the present invention, the drawings are not necessarily to scale and certain features may be exaggerated in order to better illustrate and explain the present invention.

DETAILED DESCRIPTION OF THE DRAWINGS

The embodiments disclosed below are not intended to be exhaustive or to limit the invention to the precise forms disclosed in the following detailed description. Rather, the embodiments are chosen and described so that others skilled in the art may utilize their teachings. While the present disclosure is primarily directed to a utility vehicle, it should be understood that the features disclosed herein may have application to other types of vehicles such as other all-terrain vehicles, motorcycles, snowmobiles, and golf carts.

Referring to FIG. 1, an illustrative embodiment of a vehicle 2 is shown. Vehicle 2 may be configured for on-road and off-road conditions. Vehicle 2 includes a plurality of ground-engaging members 4, illustratively front wheels 6 and a single rear wheel 8. In one embodiment, one or more of ground-engaging members 4 may be replaced with tracks, such as the Prospector II Tracks available from Polaris Industries Inc., located at 2100 Highway 55 in Medina, Minn. 55340, or non-pneumatic tires, such as those shown in U.S. Pat. No. 8,176,957 and U.S. Pat. No. 8,104,524, the complete disclosures of which are expressly incorporated herein by reference. Illustratively, vehicle 2 is a three-wheeled vehicle and additional details of vehicle 2 may be disclosed in U.S. Pat. No. 9,004,214, filed on Mar. 21, 2012, the complete disclosure of which is expressly incorporated by reference herein.

Referring still to FIG. 1, vehicle 2 further includes a frame assembly 10 supported above a ground surface G by ground-engaging members 4. Frame assembly 10 extends along a longitudinal centerline or axis L of vehicle 2. As shown in FIG. 1, frame assembly 10 also includes roll hoops 22 which are positioned at a rear portion of vehicle 2. Because illustrative vehicle 2 is an open-cockpit type vehicle, roll hoops 22 define the upper-most surface of vehicle 2. Frame assembly 10 supports a vehicle body 12, which includes a plurality of body panels, for example a hood 13 and side view mirrors 15, which are positioned at a forward portion of vehicle 2. Frame assembly 10 also supports an operator area 14 of vehicle 2. Operator area 14 includes an operator seat 16 and a passenger seat 18 which are positioned forward of and below roll hoops 22.

Vehicle 2 includes an engine compartment 20 for a powertrain assembly (not shown) which includes an engine and a transmission. As shown in FIG. 1, engine compartment 20 is positioned forward of operator area 14, however, in an alternative embodiment of vehicle 2, engine compartment 20 may be positioned within a portion of operator area 14, rearward of operator area 14, and/or below operator area 14. The transmission of vehicle 2 may be any type of transmission, such as a shiftable transmission and/or a continuously variable transmission operably coupled to the engine. The engine is operably coupled to front and rear ground engaging members 6, 8 through front and/or rear drives and a prop shaft (not shown) and may be any type of fuel-driven engine and/or may be or include an electrical motor configured for hybrid and/or electrical operation of vehicle 2.

Illustrative vehicle 2 may be configured as an open-cabin or open-cockpit type vehicle in which seats 16, 18 are open and exposed to the weather and environment. However, vehicle 2 may be coupled with a removable sunshade or cabin cover 30 which is configured to be removable coupled to vehicle 2 to protect operator area 14 from rain, snow, high winds, hot temperatures, and any other weather conditions. Alternatively, vehicle 2 also may include other components to further enclosed operator area 14, such as doors and windshields which may cooperate with sunshade 30 to fully enclose operator area 14.

Figure 2:
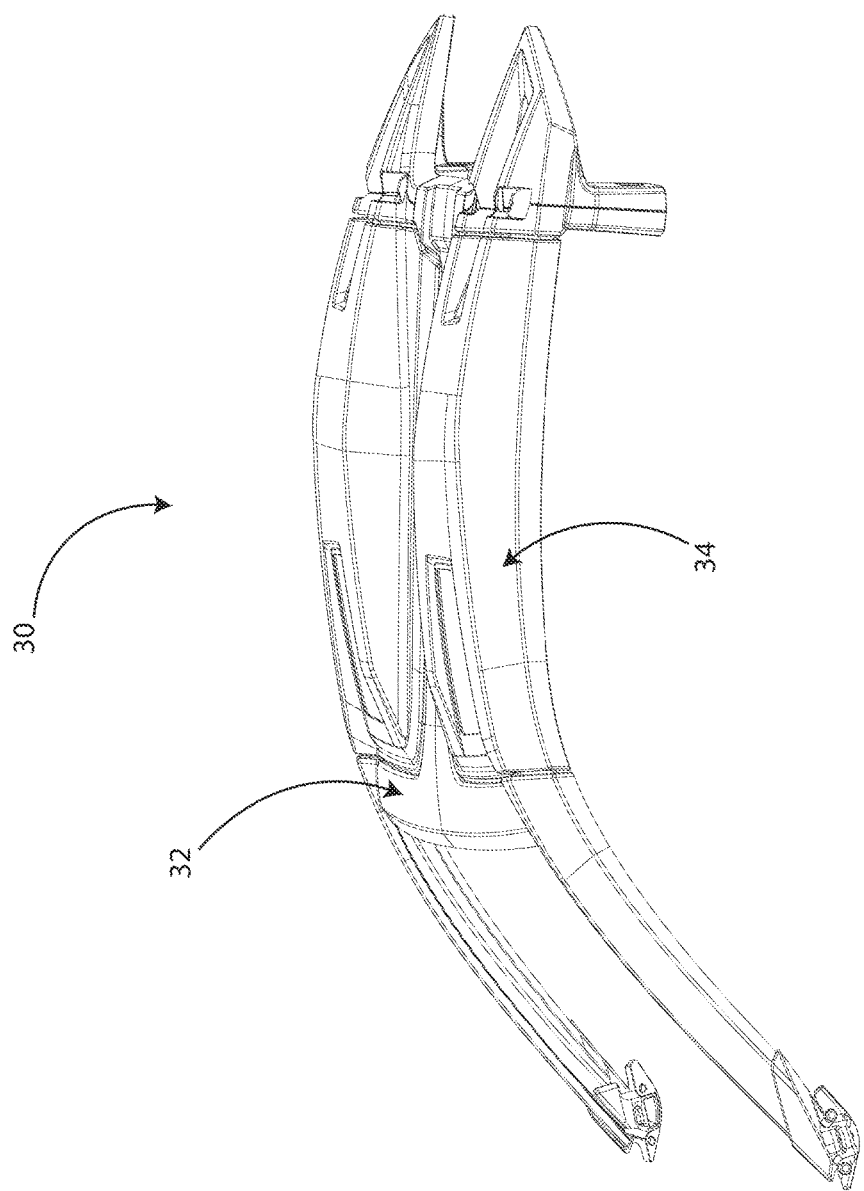
FIG. 2 is a left side perspective view of the sunshade of FIG. 1 in a lowered position.
Figure 3:
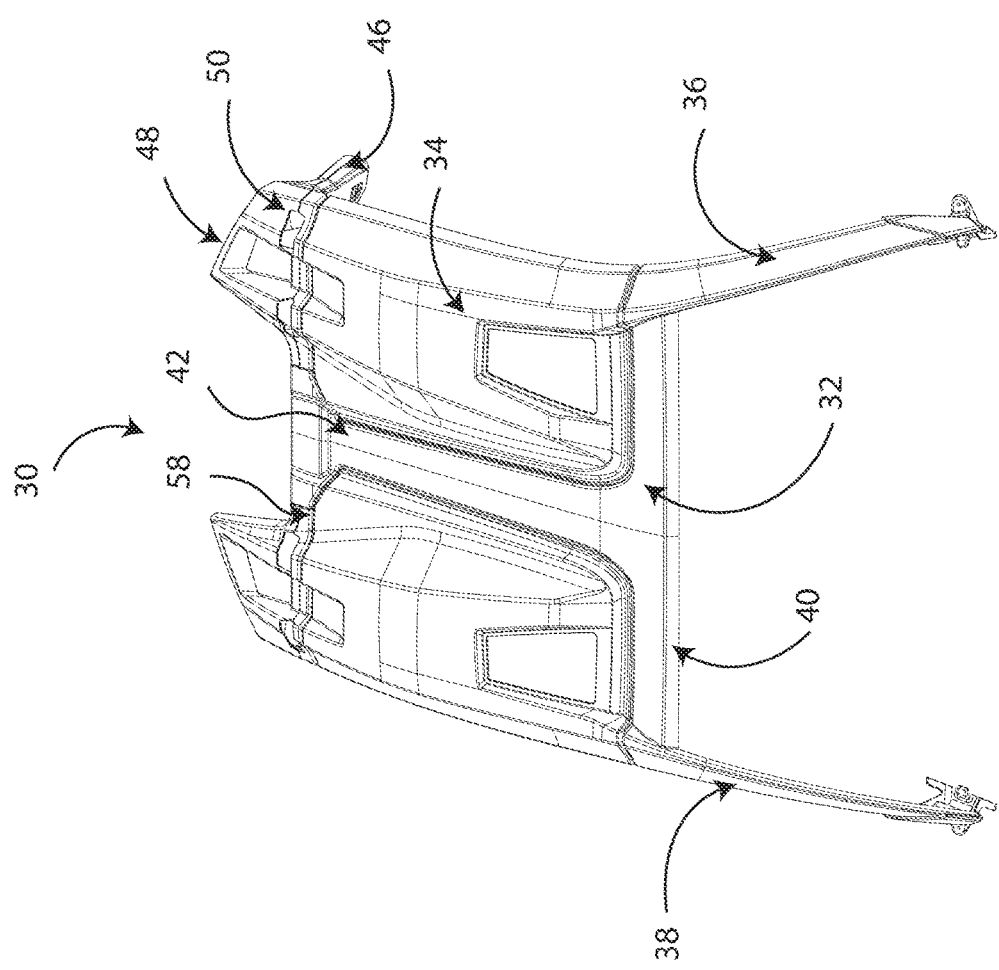
FIG. 3 is a front top perspective view of the sunshade of FIG. 1.

Referring to FIGS. 2 and 3, sunshade 30 includes a frame assembly 32 and a body 34. Body 34 is coupled to frame assembly 32 and both frame assembly 32 and body 34 are configure to extend over operator area 14. In one embodiment, frame assembly 32 may be comprised of fiberglass, illustratively fiberglass coupled with cork, and body 34 may be comprised of plastic. Alternatively, body 34 may be comprised of fabric. By comprising at least a portion of frame assembly 32 of fiberglass and at least a portion of body 34 of plastic, the overall weight of sunshade 30 may be reduced because sunshade 30 is not comprised primarily of metal components. Illustrative sunshade 30 may be less than approximately 35 lbs, and more particularly, may be approximately 27-33 lbs.

Figure 4:
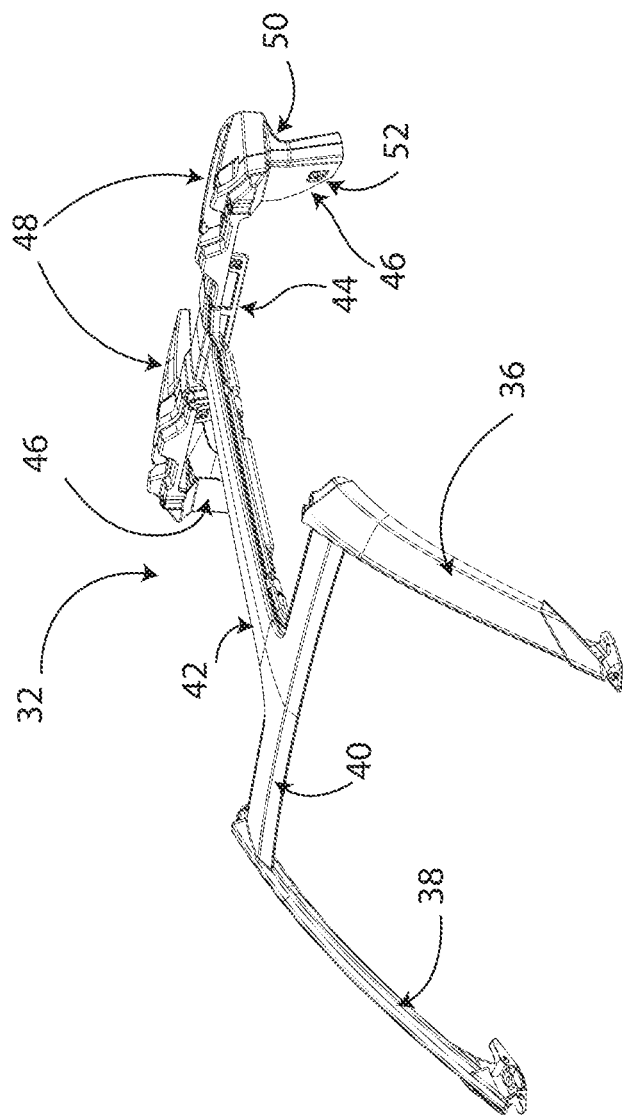
FIG. 4 is a front left perspective view of a frame of the sunshade of FIG. 1.

As shown in FIG. 4, frame assembly 32 includes a first upstanding member 36 positioned along an operator side of vehicle 2, a second upstanding member 38 positioned along a passenger side of vehicle 2, a forward cross-member 40 extending between first and second upstanding members 36, 38, a longitudinal member 42 extending rearward from forward cross-member 40, a rear cross-member 44 coupled to longitudinal member 42, forward roll hoop members 46, and rearward roll hoop members 48. Illustratively, frame assembly 32 defines a T-top style frame for sunshade 30. In one embodiment, members 36, 38, 40, 42, 44, 46, and 48 all may be separate components coupled together with conventional fasteners 52 (e.g., screws, bolts, rivets, welds, adhesive), however, in other embodiments, some or all of members 36, 38, 40, 42, 44, 46, and 48 may be integrally formed with each other. Illustratively, at least forward cross-member 40 is integrally formed with longitudinal member 42, and forward cross-member 40 also may be integrally formed with upstanding members 36, 38.

First and second upstanding members 36, 38 and forward cross-member 40 are configured to be positioned forward of operator seat 16 and passenger seat 18 (FIG. 1). As shown in FIG. 4, forward cross-member 40 defines a straight or linear surface which extends continuously in a generally horizontal line between first and second upstanding members 36, 38. As such, forward cross-member 40 may be considered a "visor" for a viewing opening 53 of vehicle 2 (FIG. 1). Additionally, longitudinal member 42 is configured to extend along longitudinal axis L and may be positioned intermediate operator seat 16 and passenger seat 18.

Illustratively, first and second upstanding members 36, 38 and forward cross-member 40 generally define viewing opening 53 for vehicle 2 that allows the operator to see in front of and to the side of vehicle 2. While not shown, a windshield may be positioned between and/or supported on any of first and second upstanding members 36, 38 and forward cross-member 40.

Figure 5:
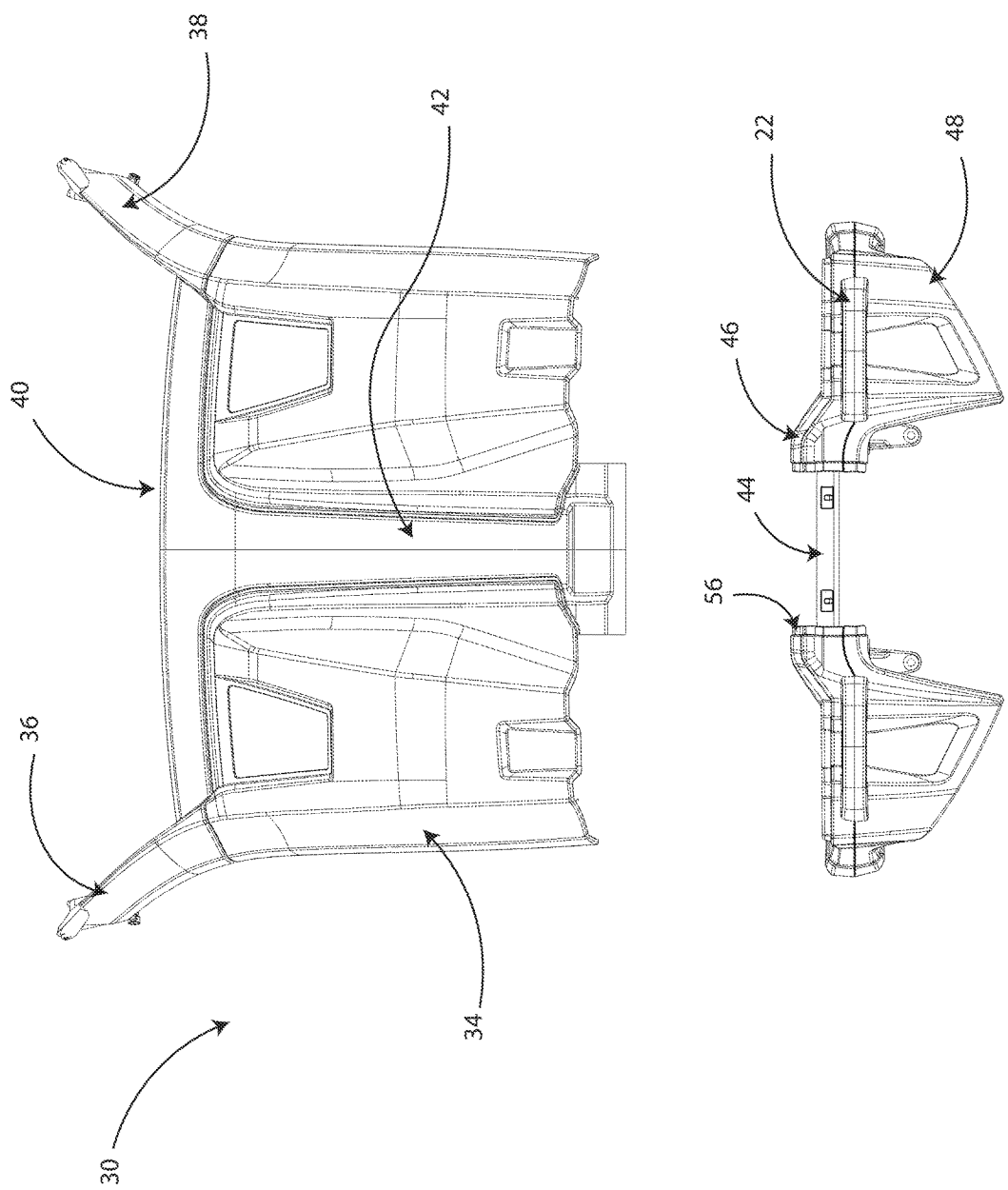
FIG. 5 is a top view of a portion of the sunshade of FIG. 1 coupled around roll hoops of the vehicle.
Figure 6:
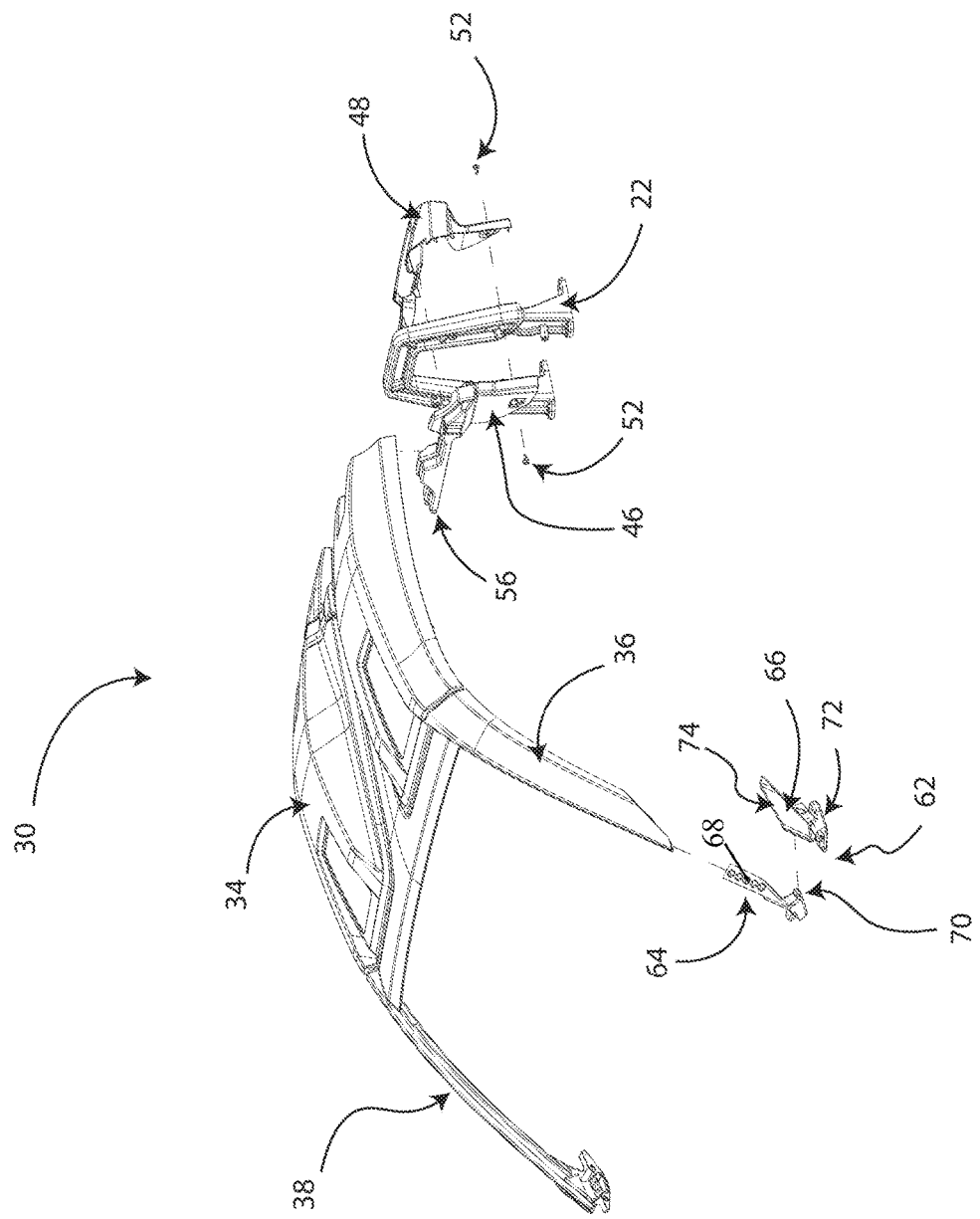
FIG. 6 is an exploded view of the sunshade of FIG. 1 and the roll hoops of FIG. 5.

Rear cross-member 44 and roll hoop members 46, 48 are configured to be positioned rearward of seats 16, 18. Illustratively, as shown in FIGS. 5 and 6, forward and rearward roll hoop members 46, 48 may be coupled together to generally surround a portion of roll hoops 22. More particularly, when forward and rearward roll hoop members 46, 48 are coupled together, an opening 50 (FIG. 3) is formed therebetween which is configured to allow the upper portion of roll hoops 22 to extend therethrough. In this way, roll hoops 22 extend through a portion of sunshade 30 and, illustratively, are positioned vertically above roll hoop members 46, 48. As such, the functionality of roll hoops 22 is maintained without interference from sunshade 30.

Additionally, and referring to FIGS. 3-6, forward roll hoop members 46 are coupled to longitudinal member 42 and also may be coupled to rear cross-member 44. More particularly, each forward roll hoop member 46 includes a coupling surface 56 which is complementary to and configured to couple with a corresponding coupling surface 58 on a rear portion of longitudinal member 42. In this way, forward roll hoop members 46 extend laterally outward from longitudinal member 42 and are positioned forward of roll hoops 22.

As is shown best in FIGS. 5 and 6, roll hoops 22 are coupled together with rear cross-member 44. Additionally, rear cross-member 44 is coupled to longitudinal member 42 with conventional fasteners. In one embodiment, longitudinal member 42 may include U-shaped clips (not shown) which couple with rear cross-member 44 and are configured to receive conventional fasteners to further couple together rear cross-member 44 and longitudinal member 42. In this way, longitudinal member 42 is removably coupled to rear cross-member 44, rather than being coupled to roll hoops 22, which may decrease side-to-side sway of sunshade 30 during operation of vehicle 2.

Referring to FIG. 6, frame assembly 32 also is removably coupled to a forward portion of vehicle 2 at side view mirrors 15 (FIG. 1). Side view mirrors 15 are coupled to vehicle 2 through mirror mounts 60, as shown in FIG. 1, and frame assembly 32 of sunshade 30 is configured to be removably coupled to mirror mounts 60. More particularly, as shown in FIG. 6, each of first and second upstanding members 36, 38 includes a mounting assembly 62 with a mounting arm 64 and a housing 66. Mounting arm 64 may be comprised of a cast metal (e.g., cast aluminum) and is configured to be positioned within a contoured portion (not shown) of first and second upstanding members 36, 38 and coupled thereto. The contoured portion of first and second upstanding members 36, 38 also may include a rib which is configured to allow water or other fluids to flow downwardly and off of frame assembly 32. Illustratively, mounting arm 64 includes a plurality of openings 68 which may receive a fastener for coupling mounting arm 64 to first and second upstanding members 36, 38. In one embodiment, openings 68 are configured to receive an adhesive or other bonding agent to bond mounting arm 64 to first and second upstanding members 36, 38. By adhesively bonding mounting arm 64 to upstanding members 36, 38, the overall weight of sunshade 30 may be reduced because metal or plastic fasteners, such as bolts, are not used. Once mounting arm 64 is coupled to first and second upstanding members 36, 38, mounting arm 64 may be concealed by another portion of frame assembly 32, a portion of body 34, and/or mirror mounts 60.

Mounting arm 64 also includes a tab 70 which is received within housing 66 to couple mounting arm 64 to housing 66. Housing 66 also is configured to be removably coupled to vehicle 2 at mirror mounts 60 with conventional, removable fasteners (e.g., bolts). More particularly, both tab 70 of mounting arm 64 and mirror mounts 60 of vehicle 2 couple to a bracket 72 of housing 66. Housing 66 also is coupled to a lower end of first and second upstanding members 36, 38 at a surface 74 of housing 66. In this way, housing 66 is coupled to mounting arm 64, first and second upstanding members 36, 38, and mirror mounts 60 of vehicle 2. By coupling sunshade 30 to mirror mounts 60 and roll hoops 22 of vehicle 2, sunshade 30 is configured to extend over the entirety of operator area 14.

Figure 7:
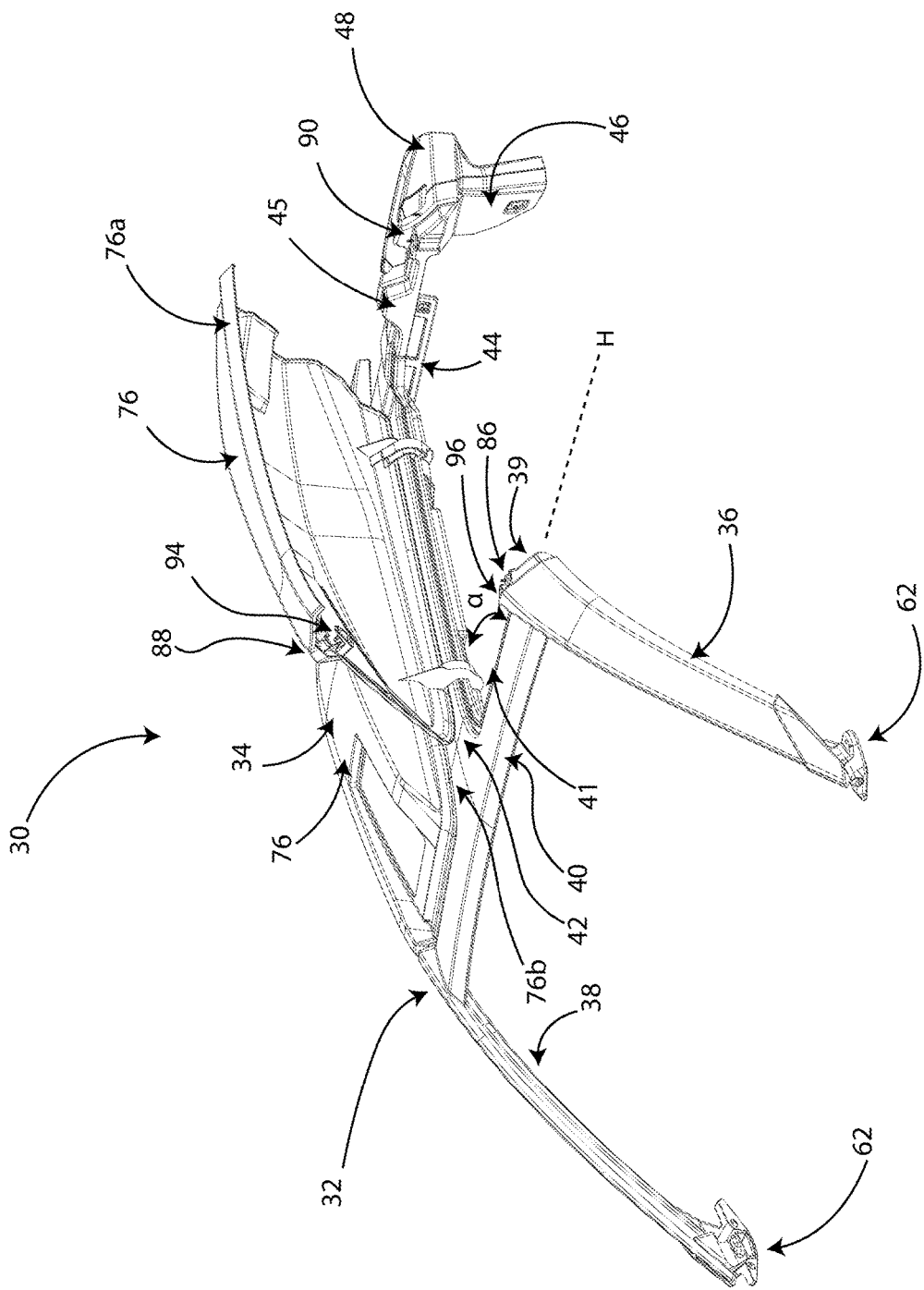
FIG. 7 is a front left perspective view of the sunshade of FIG. 1 with a portion of the sunshade in a raised position to facilitate ingress and egress.
Figure 8:
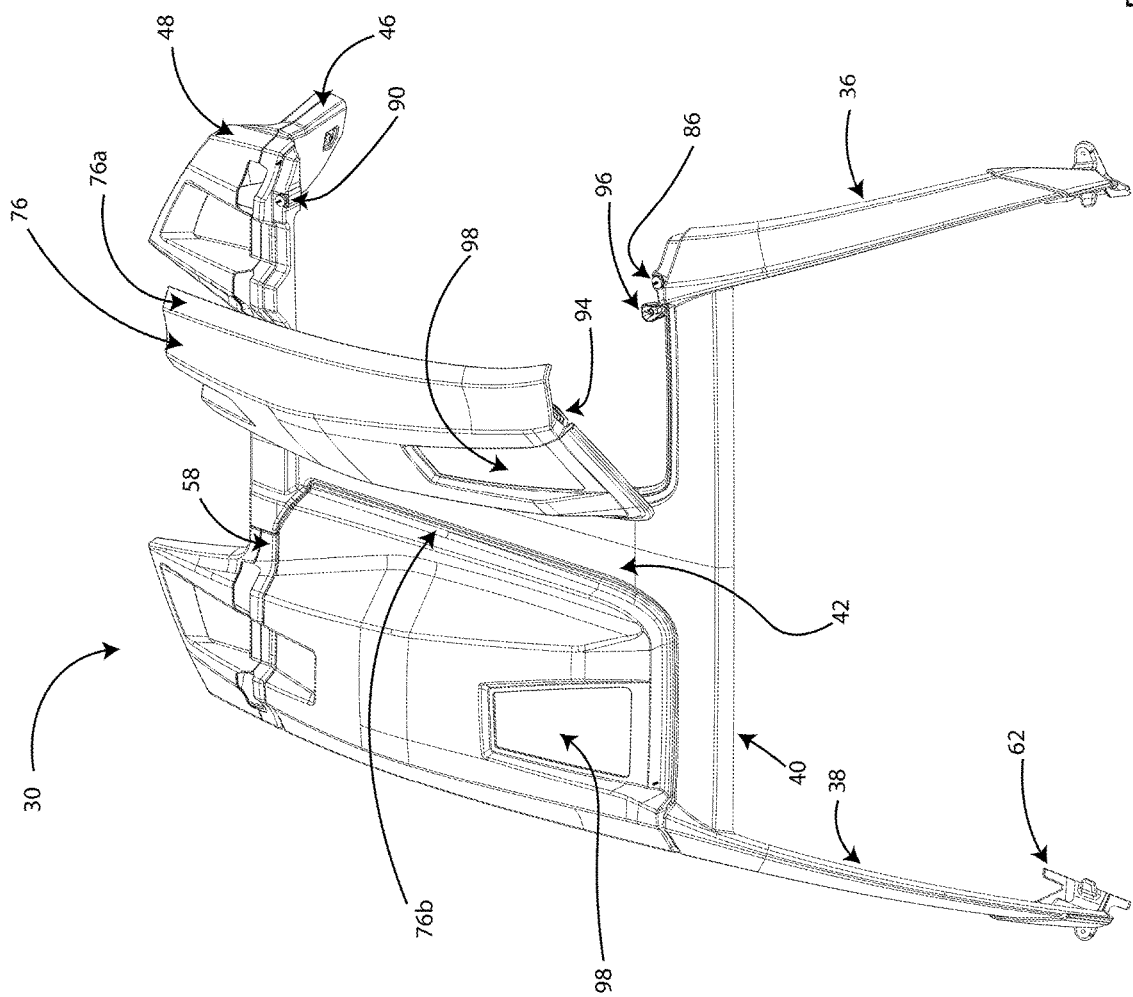
FIG. 8 is a front top perspective view of the sunshade of FIG. 1 with the portion of the sunshade in the raised position.
Figure 9:
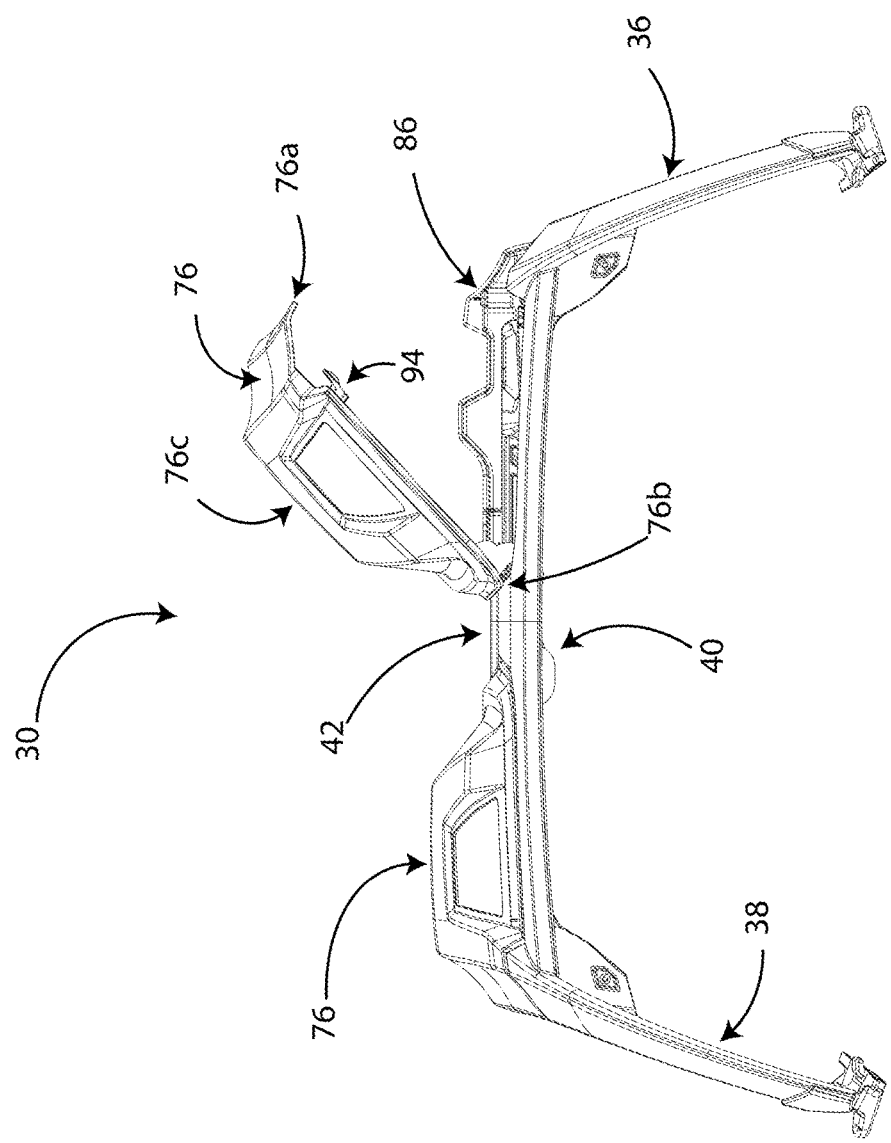
FIG. 9 is a front view of the sunshade of FIG. 1 with the portion of the sunshade in the raised position.
Figure 10:
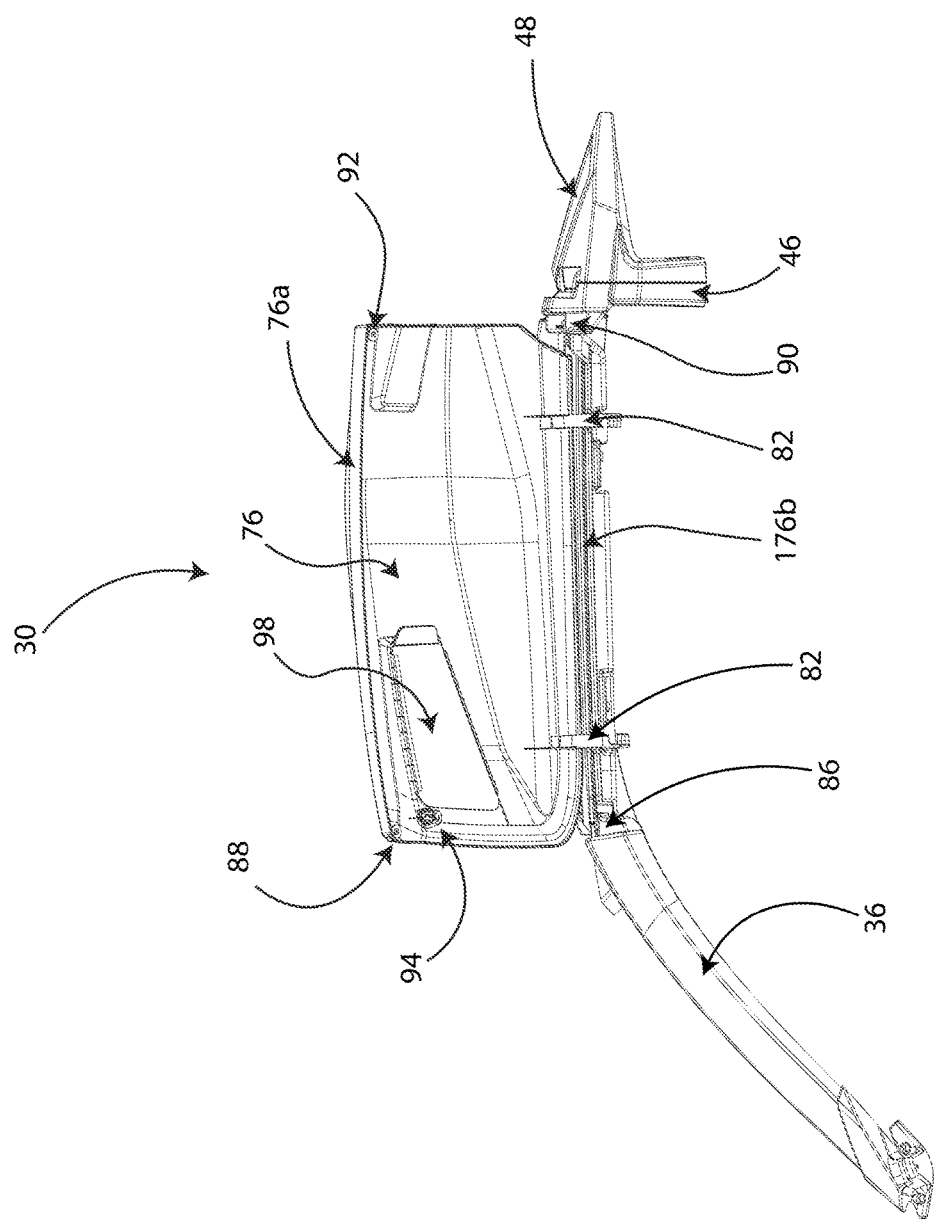
FIG. 10 is a left side view of the sunshade of FIG. 1 with the portion of the sunshade in the raised position.

Referring to FIGS. 7-10, body 34 of sunshade 30 is coupled to frame assembly 32, however, portions of body 34 are movable relative to frame assembly 32. Illustratively, body 34 includes at least doors 76 which are movably coupled to longitudinal member 42, upstanding members 36, 38, and/or forward cross-member 40. More particularly, doors 76 are configured to move in a generally upward and downward arcuate motion between a lowered position (FIG. 2) and a raised position as shown in FIG. 7 to facilitate ingress and egress for an operator or passenger. While only door 76 on the operator side of vehicle 2 is shown in the raised position, both doors 76 of sunshade 30 are configured to move between the raised and lowered positions. By moving doors 76 upwardly to the raised position, the operator or passenger has sufficient headroom to enter or leave operator area 14. In one embodiment, when doors 76 are in the raised position, doors are angled relative to frame assembly 32 and a horizontal plane H which is parallel to ground surface G (FIG. 1) by an angle α. Angle α may be approximately 20-90 degrees relative to horizontal plane H and, illustratively, may be approximately 45 degrees.

As shown in FIG. 7, doors 76 are configured to seal with a front surface 45 of forward roll hoop member 46, a rearward surface 41 of forward cross-member 40, and a rearward surface 39 of first and second upstanding members 36, 38 when moved downwardly into the lowered position of FIG. 2. Conversely, doors 76 move away from surfaces 45, 41, 39 when in the raised position. The entirety of doors 76, including an outer surface 76a and an inner surface 76b, are configured to pivot or move relative to frame assembly 32. However, when doors 76 are in the lowered position, outer surface 76a of doors 76 is generally flush with first and second upstanding members 36, 38 to provide the appearance of a continuous surface extending from upstanding members 36, 38, through doors 76, and to forward roll hoop members 46.

Figure 13A:
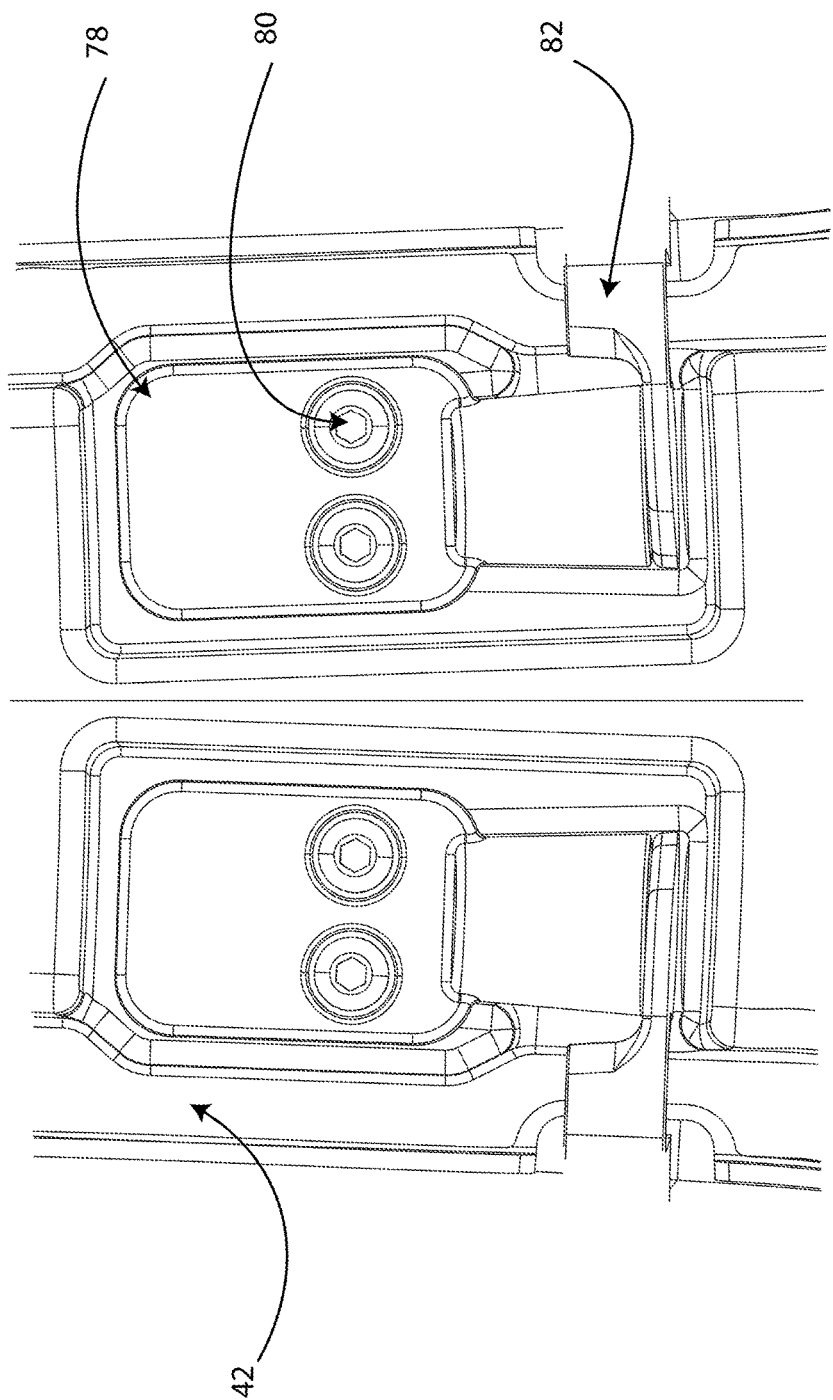
FIG. 13A is a detailed bottom view of the hinges of FIG. 12.
Figure 13B:
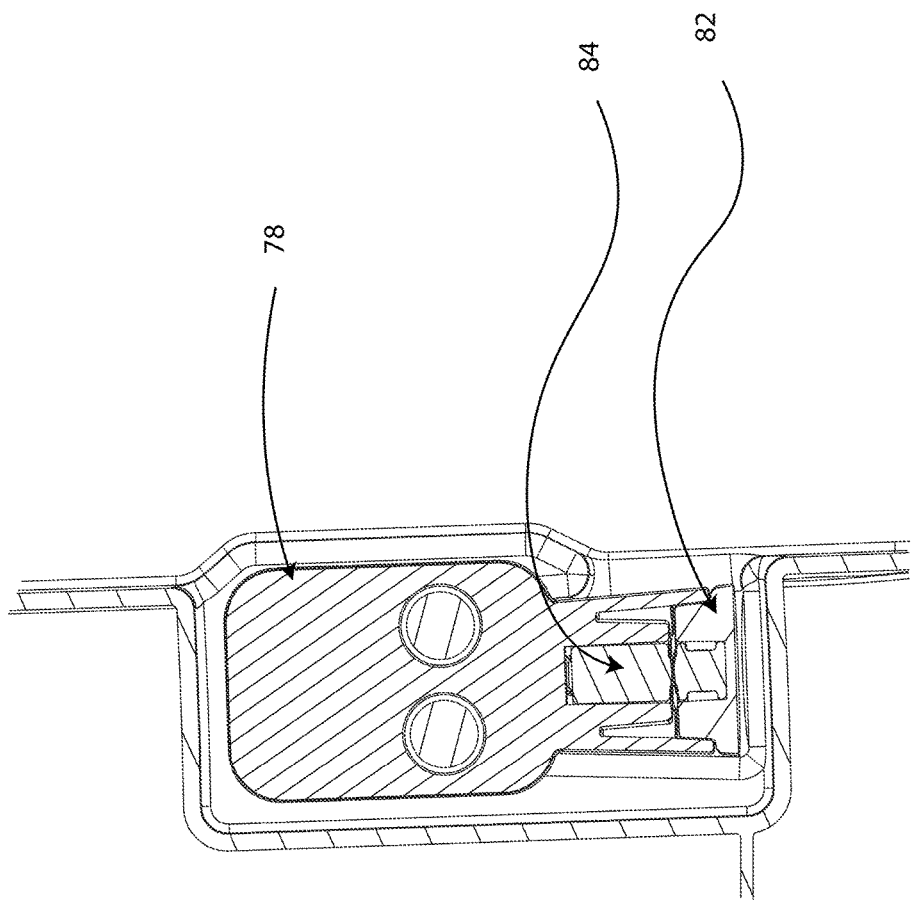
FIG. 13B is a cross-sectional view of one of the hinges of FIG. 12.

To facilitate movement of doors 76, frame assembly 32 includes a plurality of hinges 78 which are coupled to an underside of longitudinal member 42 with conventional fasteners 80, as shown in FIGS. 12-13B. Alternatively, hinges 78 may be coupled to another portion of sunshade 30. Hinges 78 include a hinge or lever arm 82 which extends from hinge 78 to doors 76. Lever arms 82 are configured to pivot about a pin 84 on hinge 78 to move doors 76 between the raised and lowered positions, as shown in FIG. 13. As shown, pin 84 may be parallel to longitudinal axis L (FIG. 1) of vehicle 2 such that doors 76 are configured to pivot upwardly and downwardly about an axis parallel to longitudinal axis L. Illustrative hinges 78 are friction hinges which provide resistance against movement in a specific direction. More particularly, hinges 78 are friction hinges which are configured to provide resistance against downward movement such that hinges 78 maintain doors 76 in the raised position until the operator or passenger pulls down on doors 76 with sufficient force to overcome the resistance of hinges 78. In this way, if the operator or passenger raises doors 76 when entering or exiting vehicle 2, doors 76 remain in the raised position due to hinges 78 such that the operator or passenger does not have to continuously push up on doors 76 to maintain the raised position.

When doors 76 are in the lowered position (FIG. 2), doors 76 are magnetically coupled to frame assembly 32 and/or body 34. In this way, doors 76 are magnetically retained in the lowered position and are frictionally retained in the raised position. More particularly, and referring again to FIGS. 7-11, first and second upstanding members 36, 38 and/or forward cross-member 40 includes a first magnet 86. First magnet 86 is magnetically attracted to a second magnet 88 on a forward portion of doors 76 (shown best in FIG. 10)

to magnetically couple or retain at least the forward portion of doors 76 in the lowered position. Additionally, forward roll hoop member 46 includes a third magnet 90 which is magnetically attracted to a fourth magnet 92 on a rearward portion of doors 76 (as shown best in FIG. 10) to magnetically couple or retain at least the rearward portion of doors 76 in the lowered position. As such, magnets 86, 88, 90, 92 magnetically retain doors 76 in the lowered position during operation of vehicle 2. In one embodiment, some or all of magnets 86, 88, 90, 92 may be screwed into frame assembly 32 and doors 76.

Additionally, as shown in FIGS. 7-11, doors 76 may further include a latch arm 94 which is configured to receive a latch base 96 on forward cross-member 40 to further maintain doors 76 in the lowered position during operation of vehicle 2. More particularly, illustrative latch arm 94 is L-shaped and configured to pivot toward and away from latch base 96. In this way, when latch arm 94 is in contact with latch base 96, latch arm 94 is in a closed position and the combination of magnets 86, 88, 90, 92, latch arm 94, and latch base 96 maintains doors 76 in the lowered position, even if vehicle 2 is operating during high winds. However, when latch arm 94 is pivoted away from latch base 96, latch arm 94 is in an open position and only magnets 86, 88, 90, 92 maintain doors 76 in the lowered position. If the operator and/or passenger wants to move door 76 to the raised position, the operator and/or passenger may pivot latch arm 94 away from latch base 96 and push up on door 76 with sufficient force to overcome the magnetic force of magnets 86, 88, 90, 92 to move door 76 to the raised position, where is then held in the raised position by friction hinges 78.

Referring still to FIGS. 7-11, doors 76 each include a window or sunroof portion 98 which allows light into operator area 14 and also may expand the field-of-view of the operator and passenger. Alternatively, windows 98 may be removed such that doors 76 include an opening where windows 98 may be placed and the opening can allow air flow into operator area 14.

Additionally, doors 76 are configured to have a rounded and downwardly-facing concave shape relative to longitudinal member 42 such that doors 76 extend vertically above frame assembly 32. More particularly, an uppermost surface 76c of doors 76 extends above outer and inner surfaces 76a, 76b to define the uppermost surface of doors 76. In one embodiment, the elevated and rounded shape of doors 76 define the upper-most surface of vehicle 2 when sunshade 30 is coupled thereto because doors 76 are at a height greater than the height of roll hoops 22 relative to ground surface G (FIG. 1). Although, when sunshade 30 is not coupled to vehicle 2, roll hoops 22 define the upper-most surface of vehicle 2. Because both doors 76 have a rounded and elevated configuration, sunshade 30 is designed in a "double bubble" configuration. The rounded and elevated configuration of doors 76 provides additional headroom for the operator and passenger within operator area 14. Also, because all surfaces of doors, including surfaces 76a, 76b, 76c, are configured to move when doors 76 are moved between the raised and lowered positions, doors 76 allow for additional headroom when the operator and passenger are both in operator area 14 and when entering/exiting operator area 14. If, for example, outer surface 76a was not configured to move with doors 76, then the operator and passenger may not have sufficient headroom to easily enter/exit operator area 14.

Figure 11:
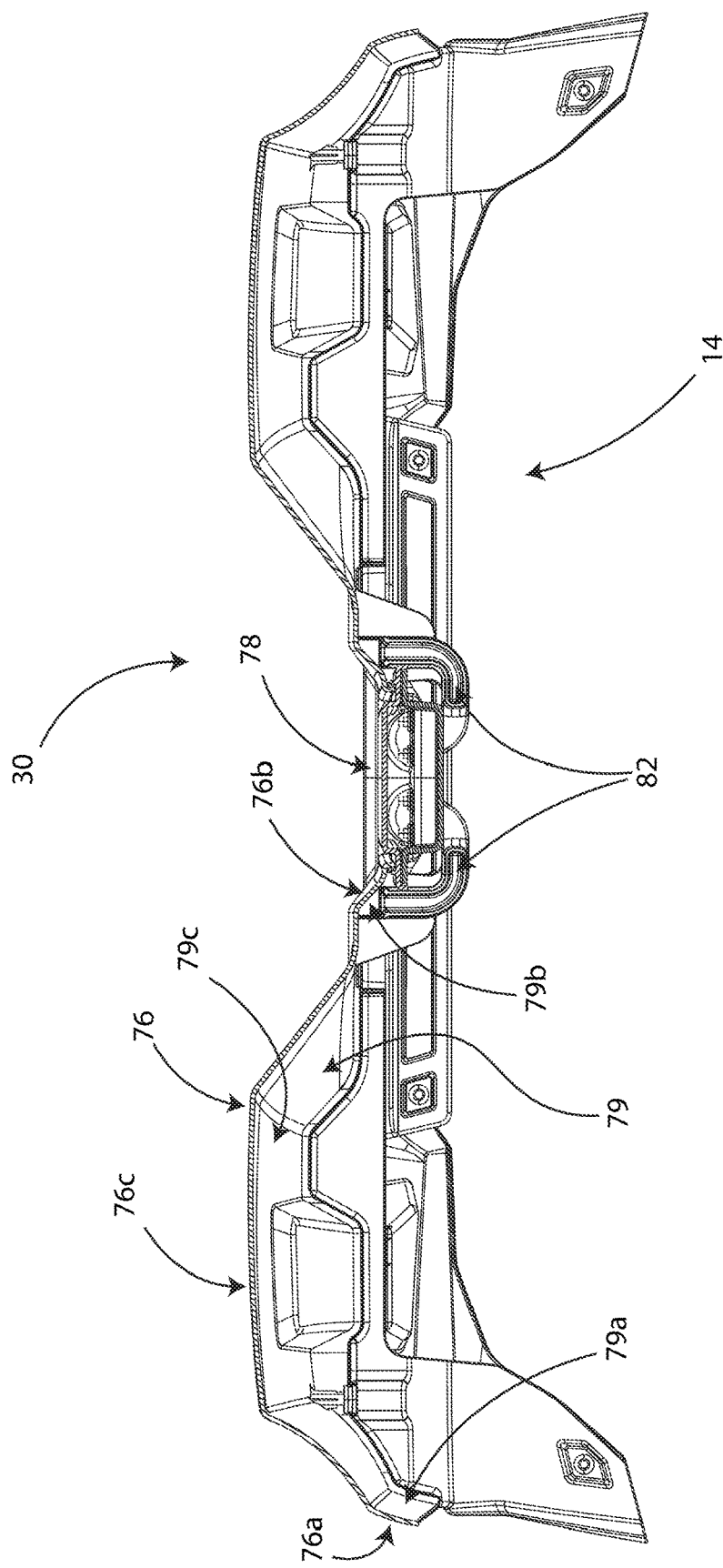
FIG. 11 is a cross-sectional view of the sunshade of FIG. 1.

In this way, as shown in FIG. 11, the shape and configuration of doors 76 provide additional headroom to the operator and passenger within operator area 14 because an inner surface 79 of doors 76 faces operator area 14 and includes an uppermost portion 79c which is at a greater height relative to an outer portion 79a of inner surface 79 and relative to an inner portion 79b of inner surface 79. In this way, both uppermost surface 76c and uppermost portion 79c are at a greater vertical height than other portions of doors 76, including outer surface 76a, inner surface 76b, outer portion 79a, and inner portion 79b. Additionally, surfaces 76c, 79c are both positioned at a height greater than the height of frame assembly 32, whereas surfaces 76a, 76b, 79a, 79b are positioned generally at the same height as that of frame assembly 32. The operator's head is configured to be positioned below uppermost portion 79c of inner surface 79 and between portions 79a, 79b of inner surface 79 such that the operator's head is positioned within the "double bubble" for additional headroom.

Referring now to FIGS. 14-25, an alternative embodiment of sunshade 30 (FIG. 2) is shown as sunshade 100, with like reference numbers indicating like components with similar functionality and configuration to those of sunshade 30 (FIG. 2). As shown in FIGS. 14-18B, as with sunshade 30 of FIG. 2, frame assembly 32 of sunshade 100 includes first upstanding member 36 positioned along the operator side of vehicle 2, second upstanding member 38 positioned along the passenger side of vehicle 2, forward cross-member 40 extending between first and second upstanding members 36, 38, longitudinal member 42 extending rearward from forward cross-member 40, rear cross-member 44 (FIG. 18B) coupled to longitudinal member 42, forward roll hoop members 46, and rearward roll hoop members 48.

Figure 15:
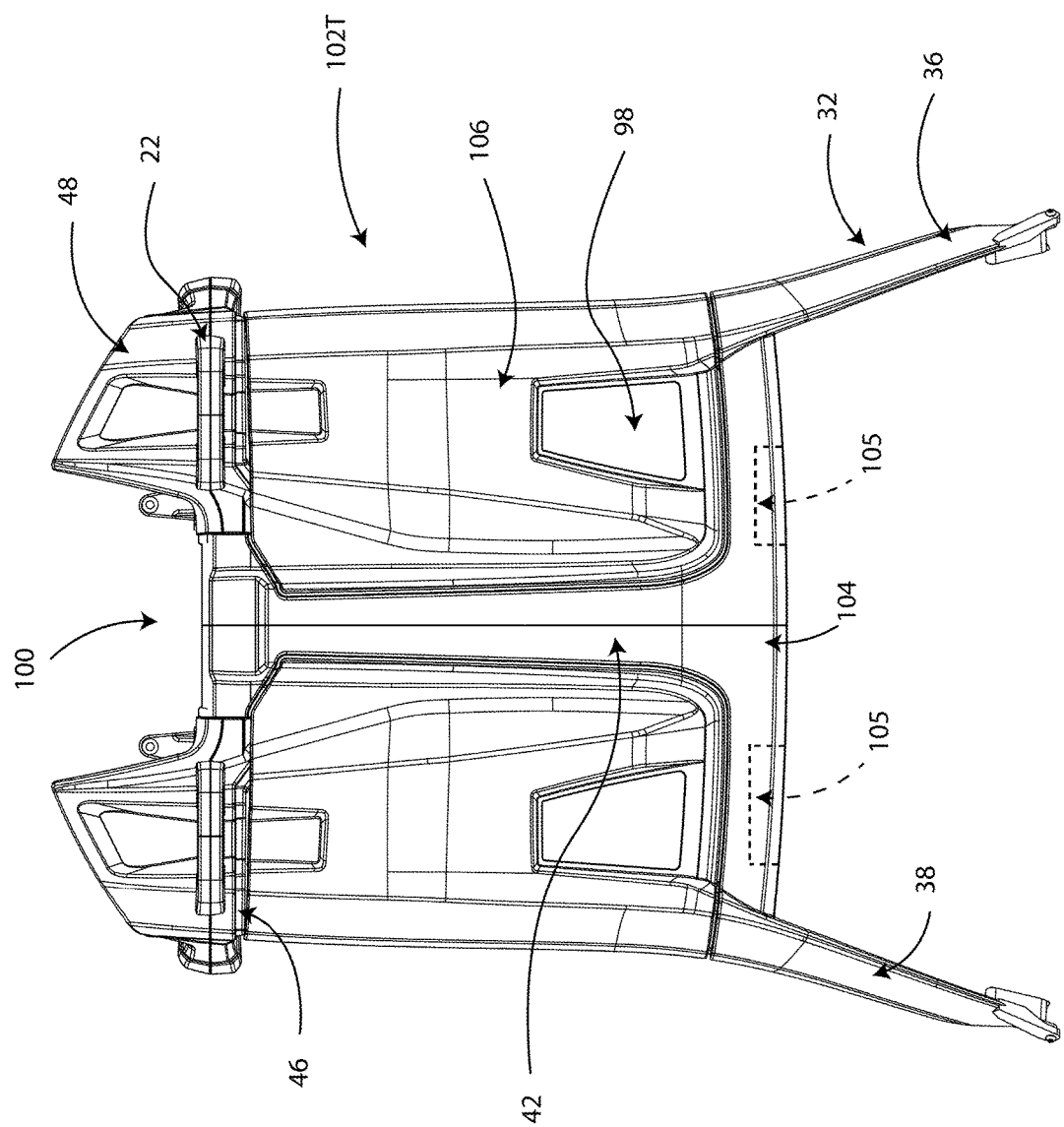
FIG. 15 is a top view of the alternative embodiment sunshade of FIG. 14.
Figure 16:
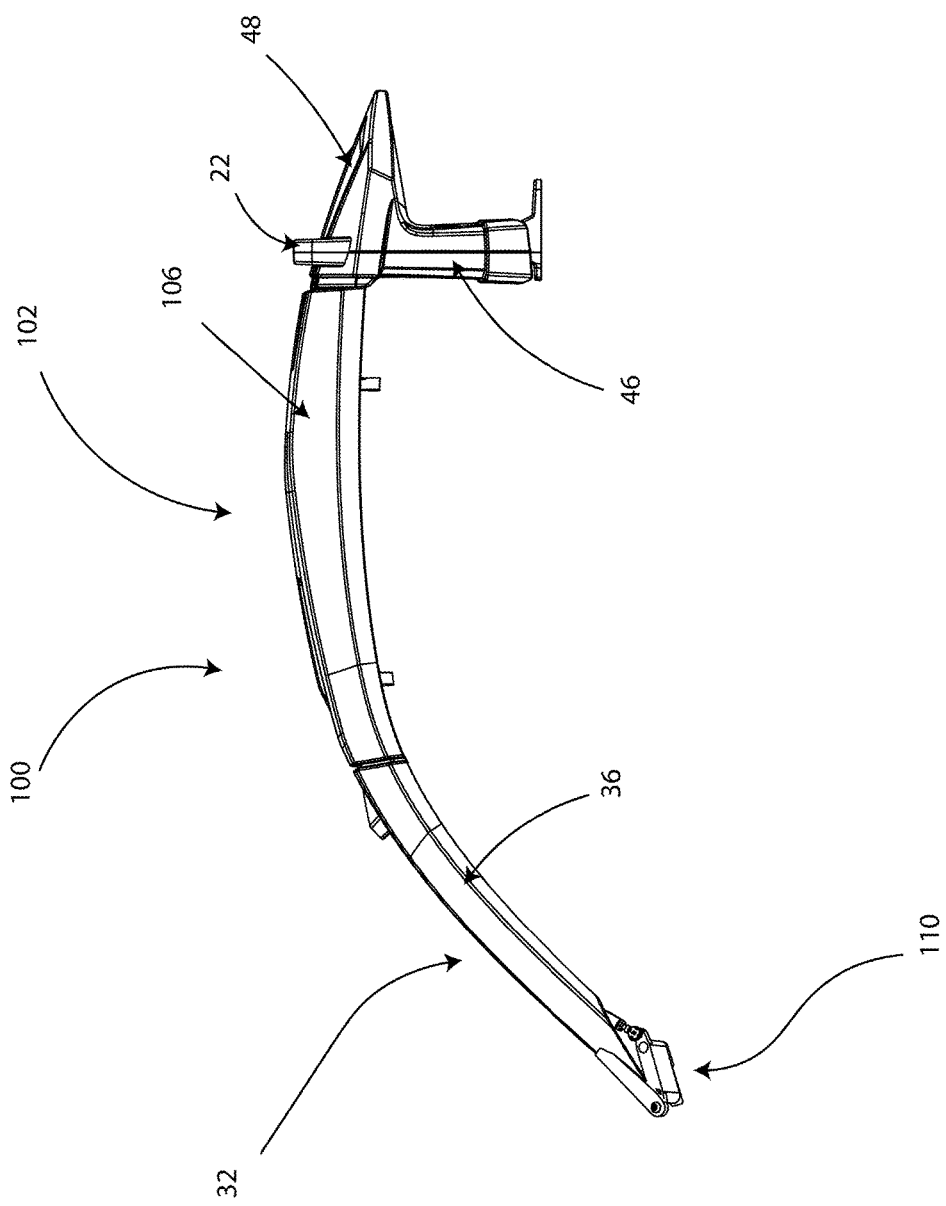
FIG. 16 is a left side view of the alternative embodiment sunshade of FIG. 14.
Figure 17:
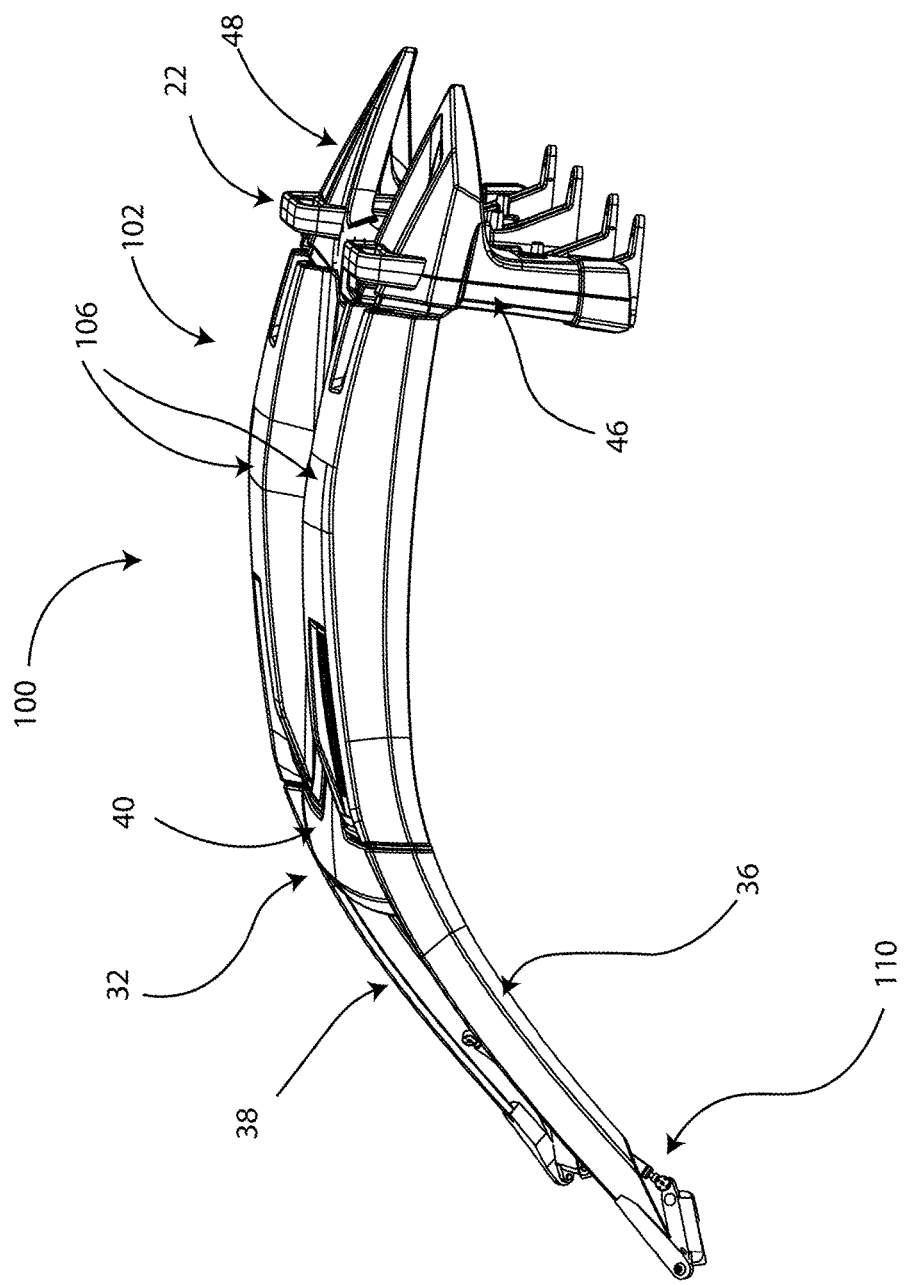
FIG. 17 is left perspective view of the alternative embodiment sunshade of FIG. 14.
Figure 18A:
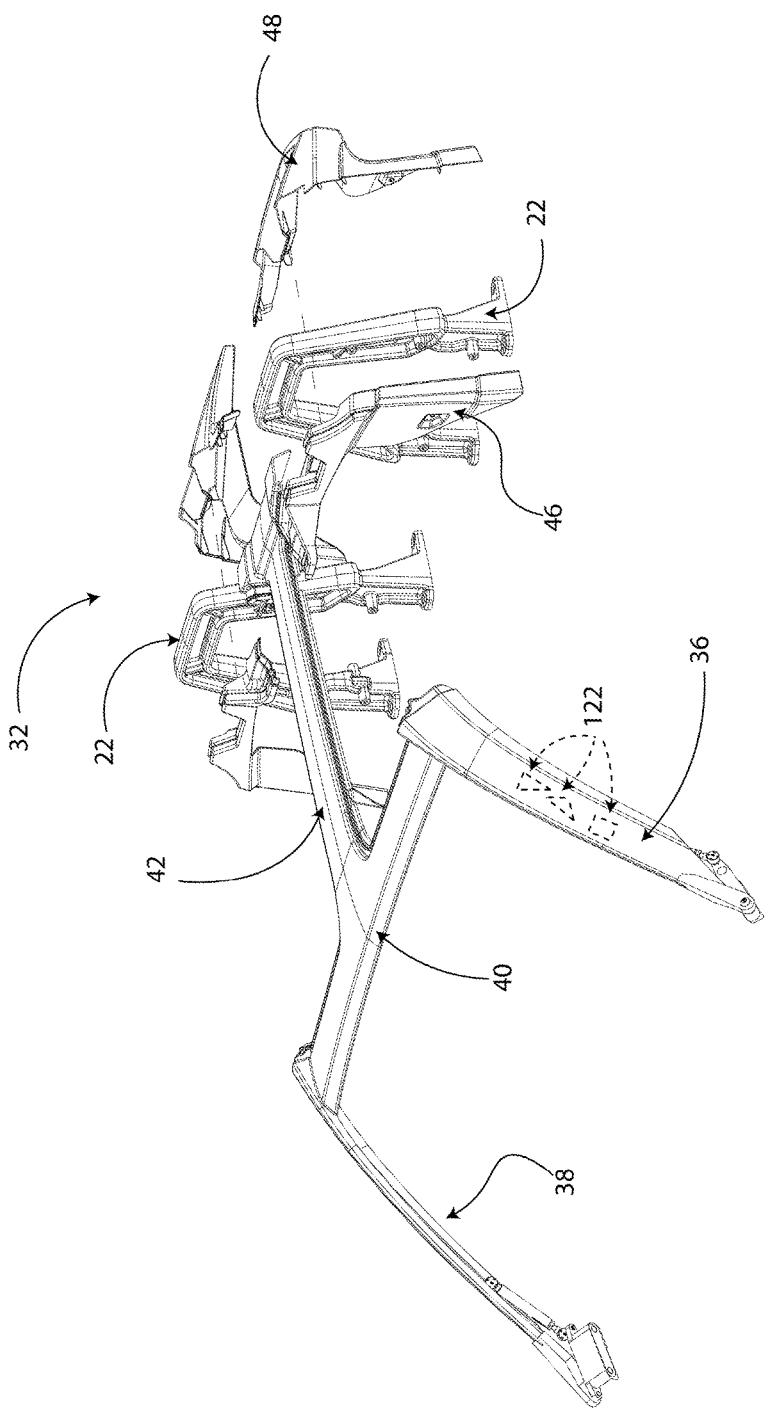
FIG. 18A is an exploded view of a frame of the sunshade of FIG. 14.

However, in one embodiment, sunshade 100 includes an alternative forward cross-member which is shown at 104 in FIG. 15. Alternative forward cross-member 104 may include recessed portions 105 which define cut-outs or open space in forward cross-member 104. Recessed portions 105 may enhance the field-of-view for the operator and the passenger by removing the portions of forward cross-member 104 which are longitudinally aligned with operator seat 16 and passenger seat 18. Additionally, first and second upstanding members 36, 38 of sunshade 100 may include cut-outs or openings 122 which also may increase the field-of-view of the operator and passenger, as shown in FIG. 18B.

Sunshade 100 also includes a body 102 coupled to frame assembly 32. Body 102 includes elevated portions 106 which are similar to doors 76 but are fixed to upstanding members 36, 38, forward cross-member 40, and longitudinal member 42. In this way, elevated portions 106 are not configured to move relative to frame assembly 32 but, instead, move with frame assembly 32, as disclosed herein. Additionally, elevated portions 106 also may include window 98 for allowing addition light into operator area 14 and/or for increasing the field-of-view for the operator and passenger. As with body 34 of sunshade 30 (FIG. 2), elevated portions 106 have a downwardly-facing concave configuration relative to and extend upwardly from frame assembly 32. In this way, body 102 also defines a "double bubble" configuration for additional headroom in operator area 14, as disclosed above with respect to doors 76 and as shown in FIG. 11. As with sunshade 30 (FIG. 2), elevated portions 106 define the upper-most surface of vehicle 2 when sunshade 100 is coupled to vehicle 2 because elevated portions 106 are at a vertical distance above ground surface G (FIG. 1) which is greater than the vertical distance of roll hoops 22 from ground surface G.

Figure 14:
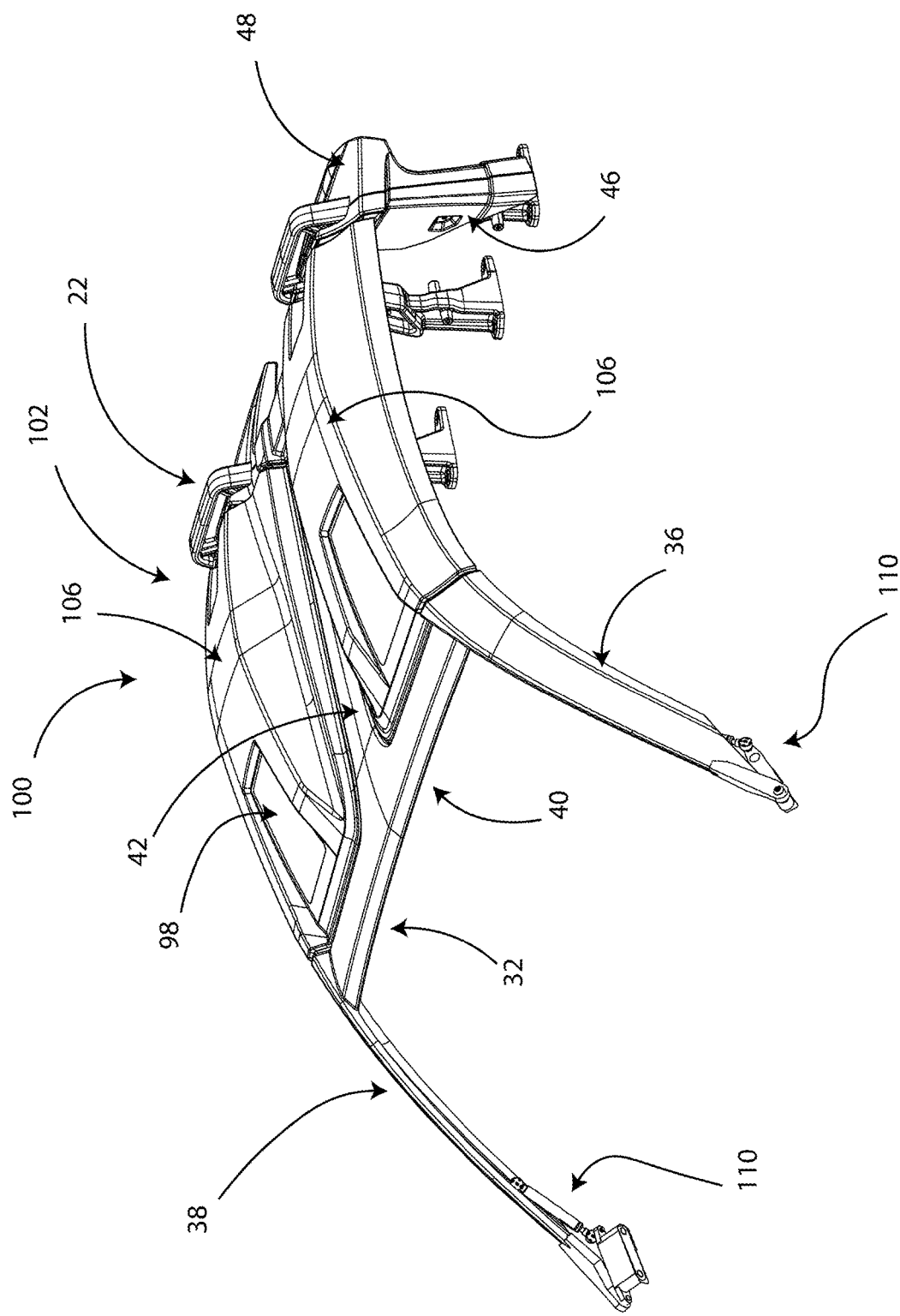
FIG. 14 is a front left perspective view of an alternative embodiment sunshade of the present disclosure.
Figure 19:
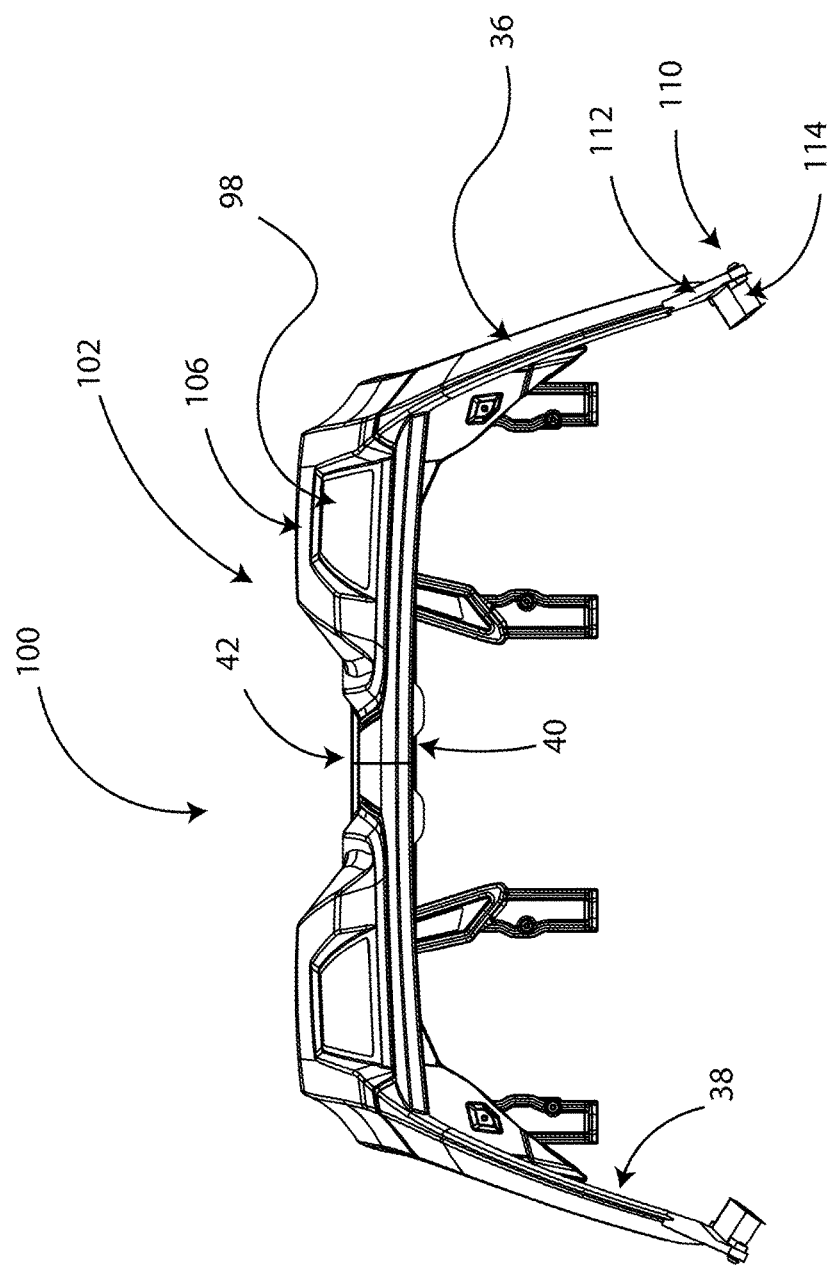
FIG. 19 is a front view of the alternative embodiment sunshade of FIG. 14.
Figure 20:
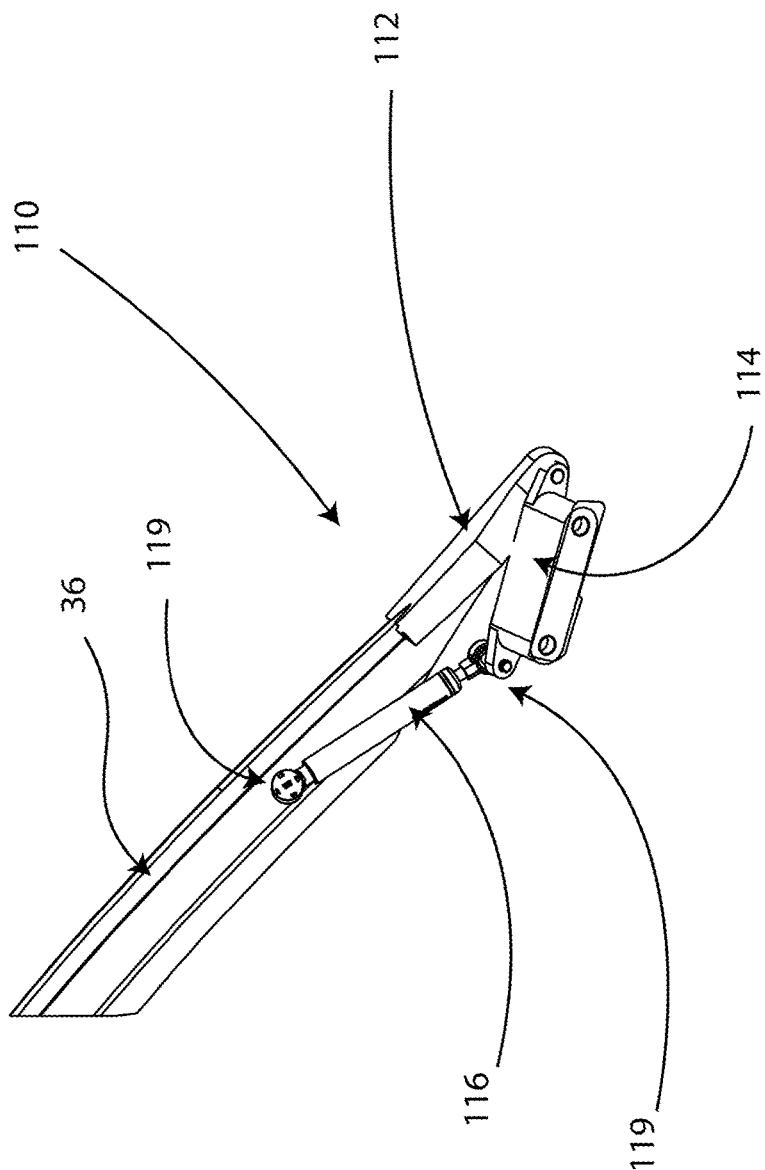
FIG. 20 is a right perspective view of an adjustment assembly of the alternative embodiment sunshade of FIG. 14 configured to move the sunshade between a raised position and a lowered position to facilitate ingress and egress, illustratively shown when the sunshade is in the lowered position.
Figure 21:
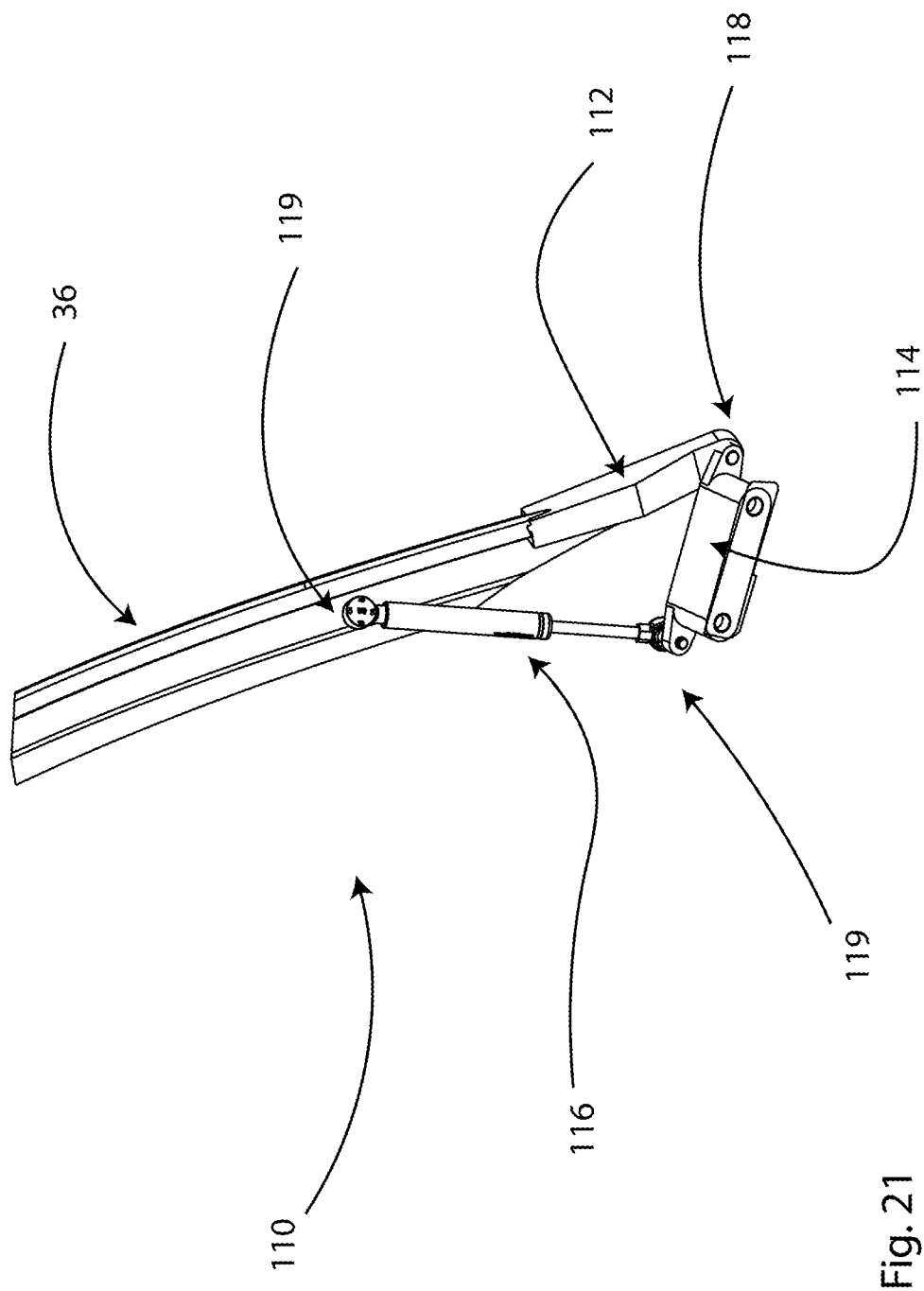
FIG. 21 is a further right perspective view of the adjustment assembly of FIG. 20, illustratively shown when the sunshade is in the raised position.

In order to create additional headroom for the operator and passenger to enter and exit operator area 14, and because sunshade 100 does not include doors 76 (FIG. 7), sunshade 100 is configured to pivot upwardly and forwardly relative to roll hoops 22 to move to a raised position. Referring to FIGS. 19-21, sunshade 100 includes an adjustment assembly 110 configured to allow sunshade 100 to pivot upwardly and forwardly to the raised position. Adjustment assembly 110 includes a mounting arm 112, a bracket 114, and a gas strut or cylinder 116. Illustratively, mounting arm 112 is coupled to first and second upstanding members 36, 38 and to bracket 114. More particularly, mounting arm 112 is fixed to upstanding member 36, 38 but is pivotably coupled to bracket 114 with a pin 118. Mounting arm 112 is configured to pivot about pin 118 when moving sunshade 100 between the raised position (FIG. 24) and the lowered position (FIG. 14). As shown, pin 118 defines a pivot axis for sunshade 100 which extends generally perpendicularly to longitudinal axis L of vehicle 2 (FIG. 1). Bracket 114 also is coupled to gas strut 116 which extends between upstanding members 36, 38 and bracket 114. Bracket 114 also is removably coupled to mirror mounts 60 of vehicle 2 (FIG. 1) with conventional fasteners (not shown) such that sunshade 100 is removably coupled to vehicle 2 at mirror mounts 60 and roll hoops 22 (FIG. 1). Gas strut 116 is coupled to upstanding members 36, 38 and to bracket 114 with spherical ball bearings 119 which allow gas strut 116 to pivot relative to bracket 114 and upstanding members 36, 38 when moving sunshade 100 between the raised and lowered positions.

Gas strut 116 is configured to facilitate movement of sunshade 100 between the raised and lowered positions such that when the operator or passenger pushes sunshade 100 upwardly or forwardly to move sunshade to the raised position, gas strut 116 controls movement of sunshade 100 between the raised and lowered positions. Additionally, gas strut 116 may be configured to hold sunshade 100 in the raised position such that the operator or passenger does not need to continuously hold sunshade 100 in the raised position when entering or exiting vehicle 2.

As shown in FIG. 20, when sunshade 100 is in the lowered position, a portion of gas strut 116 is generally aligned with a portion of upstanding member 36 and is spaced apart from mounting arm 112 by a small distance, for example 100-150 mm. However, when sunshade 100 is in the raised position, gas strut 116 is not aligned with upstanding member 36 and is spaced apart from mounting arm 112 by a greater distance, for example a distance greater than 150 mm. Illustratively, adjustment assembly 110 defines an approximately right-angle between gas strut 116 and bracket 114 when sunshade 100 is in the raised position because upstanding member 36 has been pivoted forwardly which causes gas strut 116 to be positioned generally vertically and causes bracket 114 to be positioned generally horizontally. As such, sunshade 100 is moved upwardly and forwardly relative to vehicle 2 when in the raised position to provide additional headroom for ingress and egress.

Figure 22:
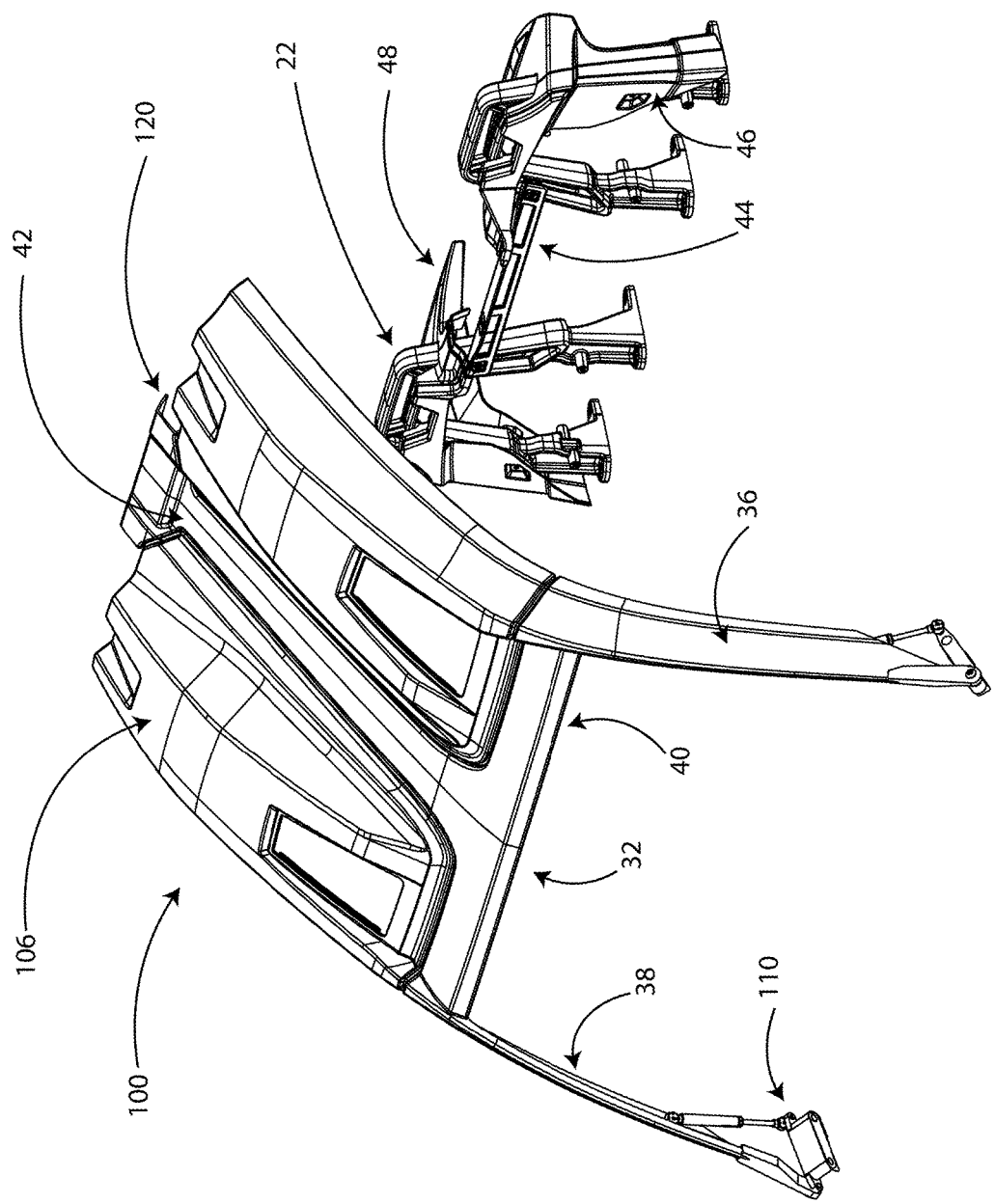
FIG. 22 is a front left perspective view of the alternative embodiment sunshade of FIG. 14 in a raised position.
Figure 23:
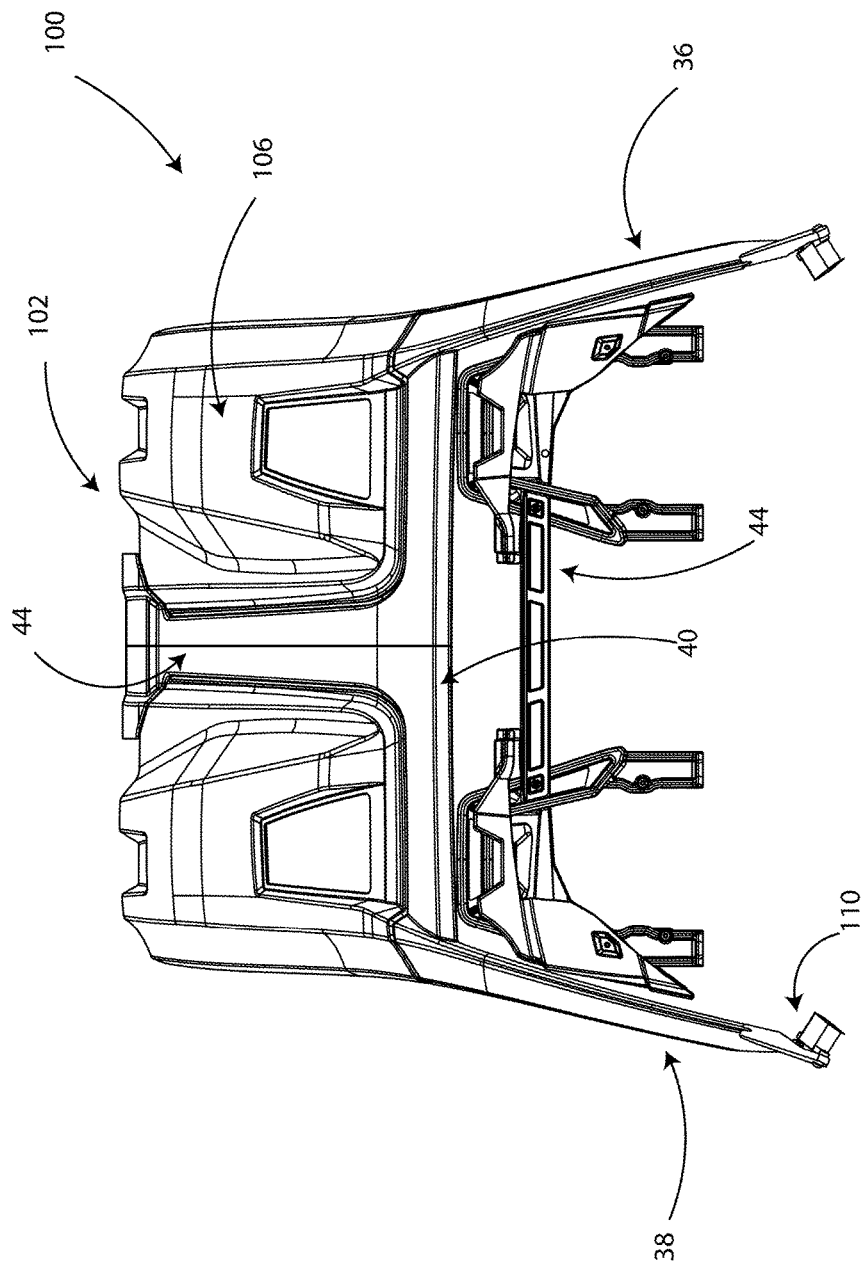
FIG. 23 is a front view of the alternative embodiment sunshade of FIG. 22 in the raised position.
Figure 24:
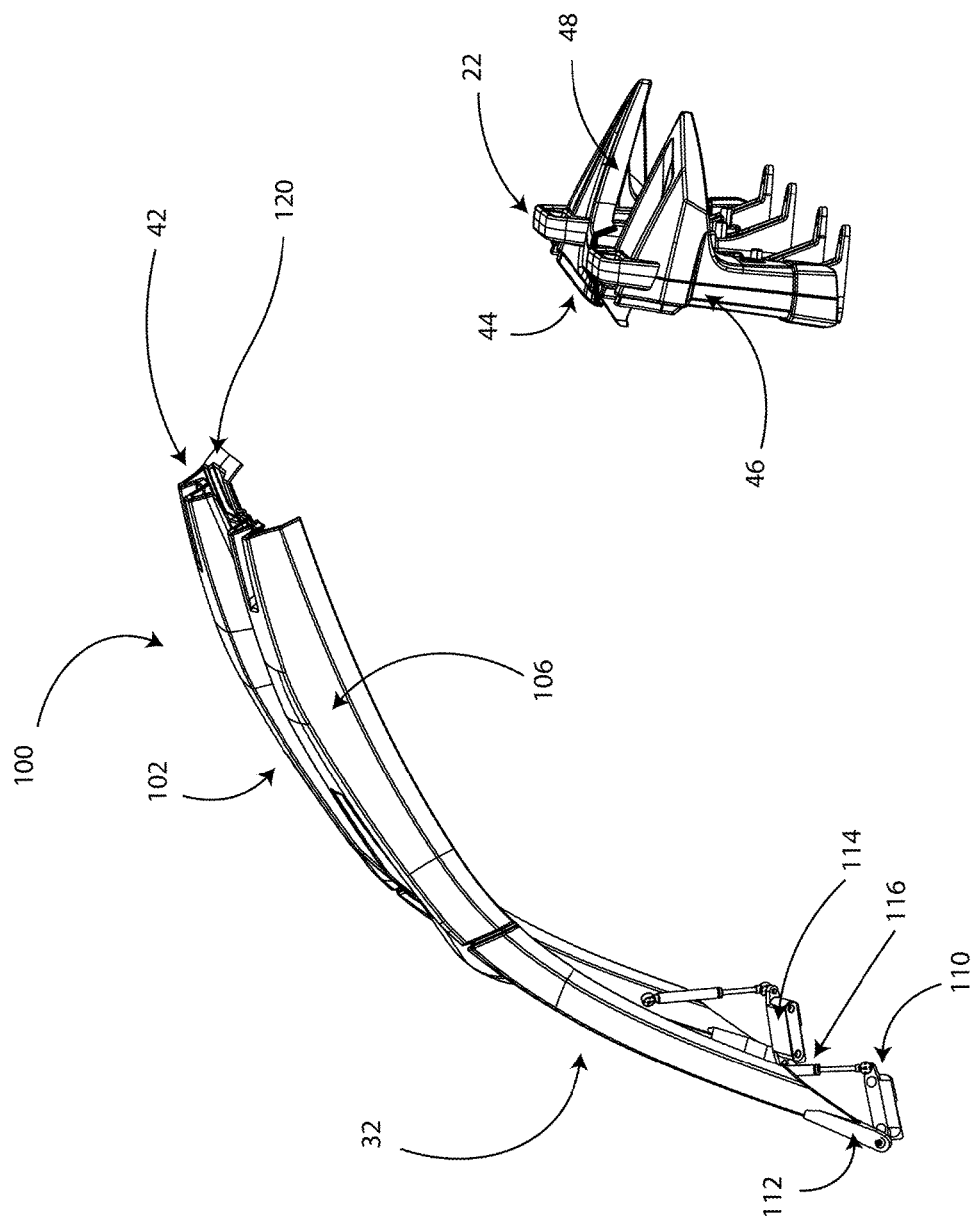
FIG. 24 is a left perspective view of the alternative embodiment sunshade of FIG. 22 in the raised position.
Figure 25:
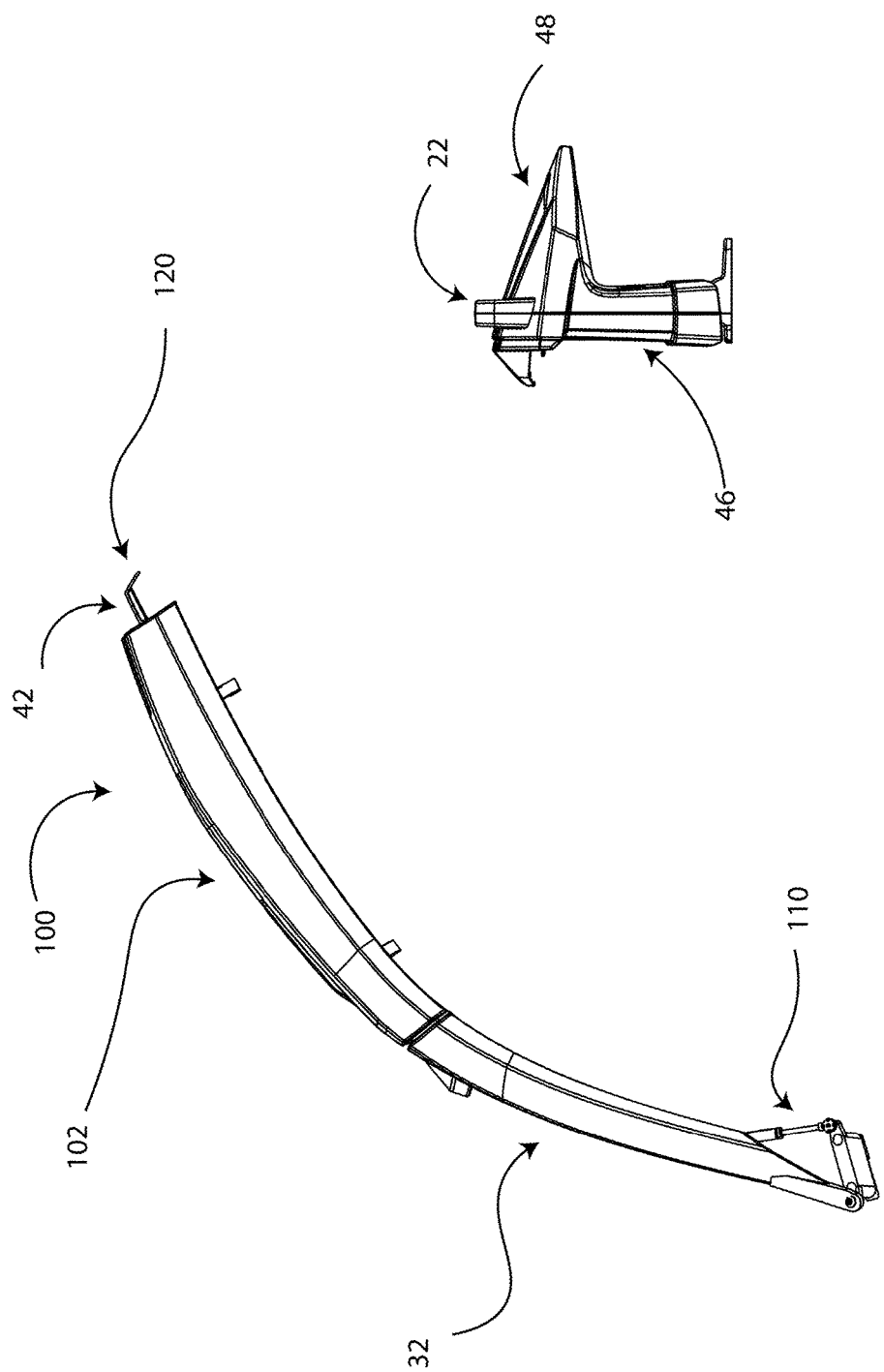
FIG. 25 is a left side view of the alternative embodiment sunshade of FIG. 22 in the raised position.

As shown in FIG. 22, when sunshade 100 is in the raised position, sunshade 100 moves upwardly and forwardly from forward roll hoop member 46 and toward mirror mounts 60 of vehicle 2 (FIG. 1). However, even when sunshade 100 is in the raised position, sunshade 100 is still positioned above operator area 14 but is at an elevated position relative to operator area 14 compared to when sunshade 100 is in the lowered position. Additionally, because body 102 of sunshade 100 is fixed to frame assembly 32, both body 102 and frame assembly 32 move together when sunshade 100 is moved between the raised and lowered positions.

Referring to FIGS. 22-25, when sunshade 100 is in the lowered position, frame assembly 32 and body 102 are retained in the lowered position by rear cross-member 44 and a lip 120 on longitudinal member 42. More particularly, longitudinal member 42 includes a lip 120 which is configured to removably couple with rear cross-member 44. In one embodiment, lip 120 of longitudinal member 120 may be magnetically retained on rear cross-member 44 or may be retained thereon with clamps or latches (not shown). In this way, the operator or passenger merely needs to unclamp or unlatch longitudinal member 42 from rear cross-member 44, or merely needs to push up on sunshade 100 with sufficient force to overcome the magnetic attraction coupling longitudinal member 42 to rear cross-member 44, to move sunshade 100 between the raised position and the lowered position. In one embodiment, the clamps or latches are accessible from outside vehicle 2 such that the operator does not need to enter vehicle 2 to move sunshade 100 to the raised position.

In one embodiment, sunshade 100 includes a push button (not shown) which is coupled to frame assembly 32 or body 102 with cables (not shown) latching and/or unlatching portions of sunshade 100 when coupled to vehicle 2.

While this invention has been described as having an exemplary design, the present invention may be further modified within the spirit and scope of this disclosure. This application is therefore intended to cover any variations, uses, or adaptations of the invention using its general principles. Further, this application is intended to cover such departures from the present disclosure as come within known or customary practice in the art to which this invention pertains.

What is claimed is:

1. A sunshade configured to be positioned over an operator area of a vehicle, comprising:
    a sunshade frame assembly configured to be removably coupled to the vehicle; and
    a sunshade body coupled to the sunshade frame assembly and including at least one portion movable between a raised position and a lowered position, and when in the lowered position the at least one portion is coupled to the sunshade frame assembly, and when in the raised position the at least one portion is positioned vertically above the sunshade frame assembly, and the at least one portion extends upwardly from the sunshade frame assembly and defines an uppermost surface of the vehicle when in the lowered position.

2. The sunshade of claim 1, wherein the at least one portion is vertically aligned with an operator seat of the vehicle.

3. The sunshade of claim 1, wherein a first roll hoop of the vehicle has a generally U-shaped configuration and is longitudinally aligned with a first seat of the vehicle, and a second roll hoop of the vehicle has a generally U-shaped configuration and is longitudinally aligned with a second seat of the vehicle, the first and second roll hoops are laterally spaced apart, and the roll hoops define an upper surface of a frame assembly of the vehicle, and at least a portion of the at least one portion of the sunshade body is positioned above the roll hoops.

4. The sunshade of claim 3, wherein the at least one portion of the sunshade body defines a door configured to move between the raised position and the lowered position, and the door is spaced apart from the roll hoops.

5. The sunshade of claim 3, wherein the sunshade frame assembly is coupled to the roll hoops and the roll hoops extend upwardly from a portion of the sunshade frame assembly.

6. The sunshade of claim 5, wherein the sunshade frame assembly includes a front frame portion and a rear frame portion, and the roll hoops are positioned longitudinally intermediate the front and rear frame portions.

7. The sunshade of claim 1, wherein the at least one portion has a first surface positioned at a first height relative to the sunshade frame assembly, a second surface positioned at a second height relative to the sunshade frame assembly and interior of the first surface, and a third surface at a third height less than the first and second heights, the first height is different from the second height and the third height, and the first and third surfaces are configured to move relative to the sunshade frame assembly.

8. The sunshade of claim 7, wherein the second surface is configured to move relative to the sunshade frame assembly.

9. The sunshade of claim 1, further comprising a magnetic coupling assembly including a first magnetic member coupled to at least one of the sunshade frame assembly and the sunshade body and a second magnetic member coupled to the sunshade body, and the first and second magnetic member are configured to magnetically retain a portion of the sunshade body on the sunshade frame assembly.

10. The sunshade of claim 9, wherein the sunshade body includes a plurality of doors configured to move between a raised position and a lowered position relative to the sunshade frame assembly, and each of the doors includes the second magnetic member, and the doors are magnetically retained in the lowered position with the first and second magnetic members.

11. The sunshade of claim 10, further comprising a friction hinge coupled to the sunshade frame assembly and each of the doors, and the friction hinge is configured to maintain the doors in the raised position.

12. The sunshade of claim 11, wherein each friction hinge include a lever arm which is coupled to one of the doors.

13. The sunshade of claim 10, wherein each of the doors includes a movable latch member configured to move between an open position and a closed position, and when in the closed position, the retention member contacts a portion of the sunshade frame assembly to retain the doors in the lowered position, and when in the open position, the retention is spaced apart from the sunshade frame assembly.

14. The sunshade of claim 1, wherein the sunshade frame assembly is configured as a T-top frame having a longitudinally extending member positioned along a longitudinal centerline of the vehicle.

15. The sunshade of claim 14, wherein the at least one portion is a first door hinged to the longitudinally extending member.

16. The sunshade of claim 15, wherein the first door is positioned over a left-hand portion of the sunshade frame so as to be positionable over an operator seat.

17. The sunshade of claim 16, further comprising a second door hinged to the longitudinally extending member, wherein the second door is positioned over a right-hand portion of the sunshade frame so as to be positionable over a passenger seat.

* * * * *